US012587309B2

(12) United States Patent
Ren et al.

(10) Patent No.: US 12,587,309 B2
(45) Date of Patent: Mar. 24, 2026

(54) BLIND DECODING LIMIT TECHNIQUES FOR WIRELESS COMMUNICATIONS

(71) Applicant: QUALCOMM INCORPORATED, San Diego, CA (US)

(72) Inventors: Yuwei Ren, Beijing (CN); Iyab Issam Sakhnini, San Diego, CA (US); Huilin Xu, Temecula, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 281 days.

(21) Appl. No.: 18/253,012

(22) PCT Filed: Jan. 12, 2021

(86) PCT No.: PCT/CN2021/071188
§ 371 (c)(1),
(2) Date: May 15, 2023

(87) PCT Pub. No.: WO2022/150944
PCT Pub. Date: Jul. 21, 2022

(65) Prior Publication Data
US 2023/0421288 A1 Dec. 28, 2023

(51) Int. Cl.
*H04L 1/00* (2006.01)
*H04L 5/00* (2006.01)

(52) U.S. Cl.
CPC .......... *H04L 1/0038* (2013.01); *H04L 5/0053* (2013.01)

(58) Field of Classification Search
CPC ............................ H04L 1/0038; H04L 5/0053
See application file for complete search history.

(56) References Cited

U.S. PATENT DOCUMENTS 8,446,868 B2     5/2013  Seong et al.
2010/0041384 A1*  2/2010  Kazmi .................... H04W 8/22
(Continued)

FOREIGN PATENT DOCUMENTS

CN     109391459 A     2/2019
CN     111886826       11/2020
(Continued)

OTHER PUBLICATIONS

Supplementary European Search Report—EP21918163—Search Authority—Munich—Sep. 23, 2024.
(Continued)

*Primary Examiner* — Ronald B Abelson
(74) *Attorney, Agent, or Firm* — Holland & Hart LLP

(57) ABSTRACT

Methods, systems, and devices for wireless communications are described that support blind decoding limit adjustment techniques. A base station may configure a user equipment (UE) with one or more conditions that may trigger an adjustment to a number of blind decoding candidates that are to be monitored at the UE for a control information communication from the base station. A nominal number of blind decoding candidates may be configured at the UE, and the adjustment to the number of blind decoding candidates may reduce the number of blind decoding candidates from the nominal number, thus allowing the UE to perform blind decoding using less processing power, less time, or both. The trigger conditions may include one or more configured conditions that may support reliable communications with fewer blind decoding candidates.

10 Claims, 21 Drawing Sheets

(56) References Cited

U.S. PATENT DOCUMENTS

| | | | | |
|---|---|---|---|---|
| 2013/0155868 A1 | 6/2013 | Seo et al. | | |
| 2015/0078307 A1 | 3/2015 | Ohta | | |
| 2017/0373793 A1 | 12/2017 | Yerramalli et al. | | |
| 2019/0110279 A1 | 4/2019 | Behravan et al. | | |
| 2019/0289478 A1 | 9/2019 | Hosseini et al. | | |
| 2019/0306924 A1* | 10/2019 | Zhang | .................. | H04L 5/0051 |
| 2020/0107308 A1* | 4/2020 | Liao | ..................... | H04W 72/12 |
| 2020/0260415 A1 | 8/2020 | Li et al. | | |
| 2020/0275398 A1* | 8/2020 | Da | ................... | H04W 56/0055 |
| 2020/0305134 A1 | 9/2020 | Noh et al. | | |
| 2020/0322929 A1 | 10/2020 | Bagheri et al. | | |
| 2021/0067268 A1* | 3/2021 | Seo | ...................... | H04L 1/0052 |
| 2023/0040690 A1* | 2/2023 | Chen | ................... | H04L 5/0053 |

FOREIGN PATENT DOCUMENTS

| | | | |
|---|---|---|---|
| WO | 2010129814 A2 | 11/2010 | |
| WO | WO-2019055674 A1 | 3/2019 | |
| WO | WO-2019183085 | 9/2019 | |

OTHER PUBLICATIONS

Ericsson: "Summary of e-mail Discussions on Downlink Control Signaling", TSG-RAN WG1 #87, 3GPP Draft, R1-1612908, Summary of e-Mail Discussion on Downlink Control Signaling, 3rd Generation Partnership Project (3GPP), Mobile Competence Centre, 650 Route Des Lucioles, F-06921, Sophia-Antipolis, vol. RAN WG1, No. Reno, NV, USA, Nov. 14, 2016-Nov. 18, 2016, Nov. 13, 2016 (Nov. 13, 2016), 37 Pages, XP051190931, Appendix 2, Appendix 3, Appendix 4, Appendix5, Appendix 7.

International Search Report and Written Opinion—PCT/CN2021/071188—ISA/EPO—Sep. 28, 2021.

Sony: "On Power Saving and Battery Lifetime Enhancement for NR Redcap Devices", 3GPP TSG RAN WG1 #102e, R1-2006947, e-meeting, Aug. 17-28, 2020, 4 Pages, Aug. 28, 2020 (Aug. 28, 2020) the whole document.

Lenovo, et al., "PDCCH Monitoring at Reduced Capability UE", 3GPP TSG RAN WG1 Meeting #102-e, R1-2005933, e-Meeting, Aug. 17, 2020-Aug. 28, 2020, 5 Pages.

\* cited by examiner

1110

1120

1115

1105

1100

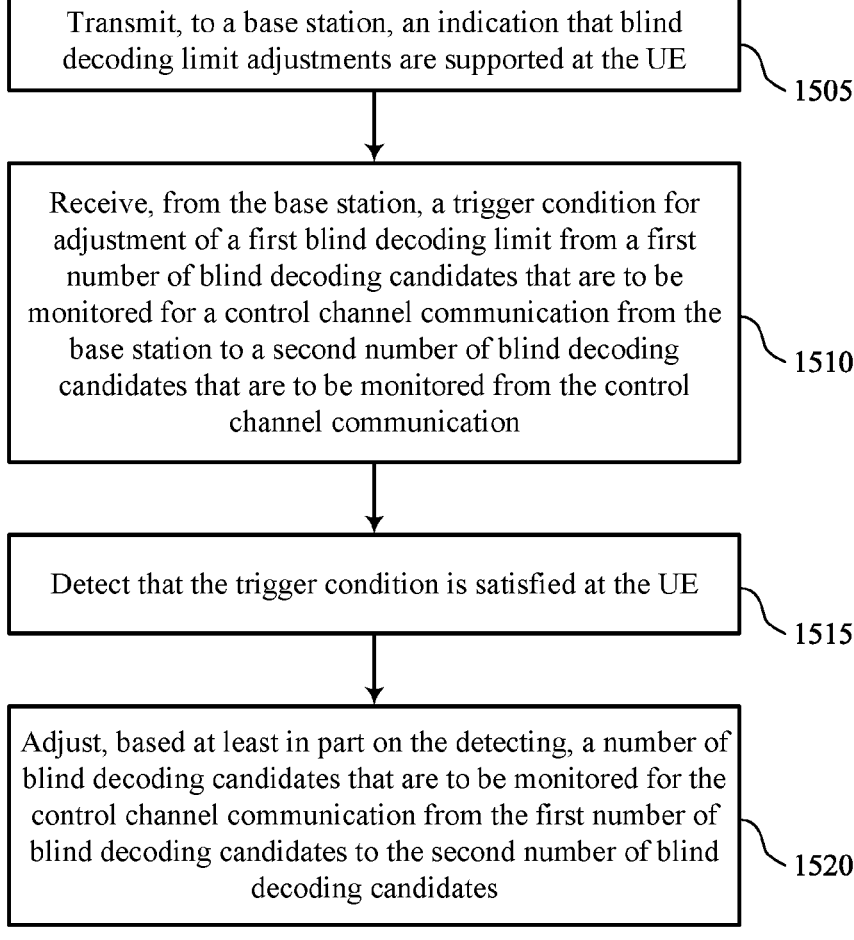

Transmit, to a base station, an indication that blind decoding limit adjustments are supported at the UE

1505

Receive, from the base station, a trigger condition for adjustment of a first blind decoding limit from a first number of blind decoding candidates that are to be monitored for a control channel communication from the base station to a second number of blind decoding candidates that are to be monitored from the control channel communication

1510

Detect that the trigger condition is satisfied at the UE

1515

Adjust, based at least in part on the detecting, a number of blind decoding candidates that are to be monitored for the control channel communication from the first number of blind decoding candidates to the second number of blind decoding candidates

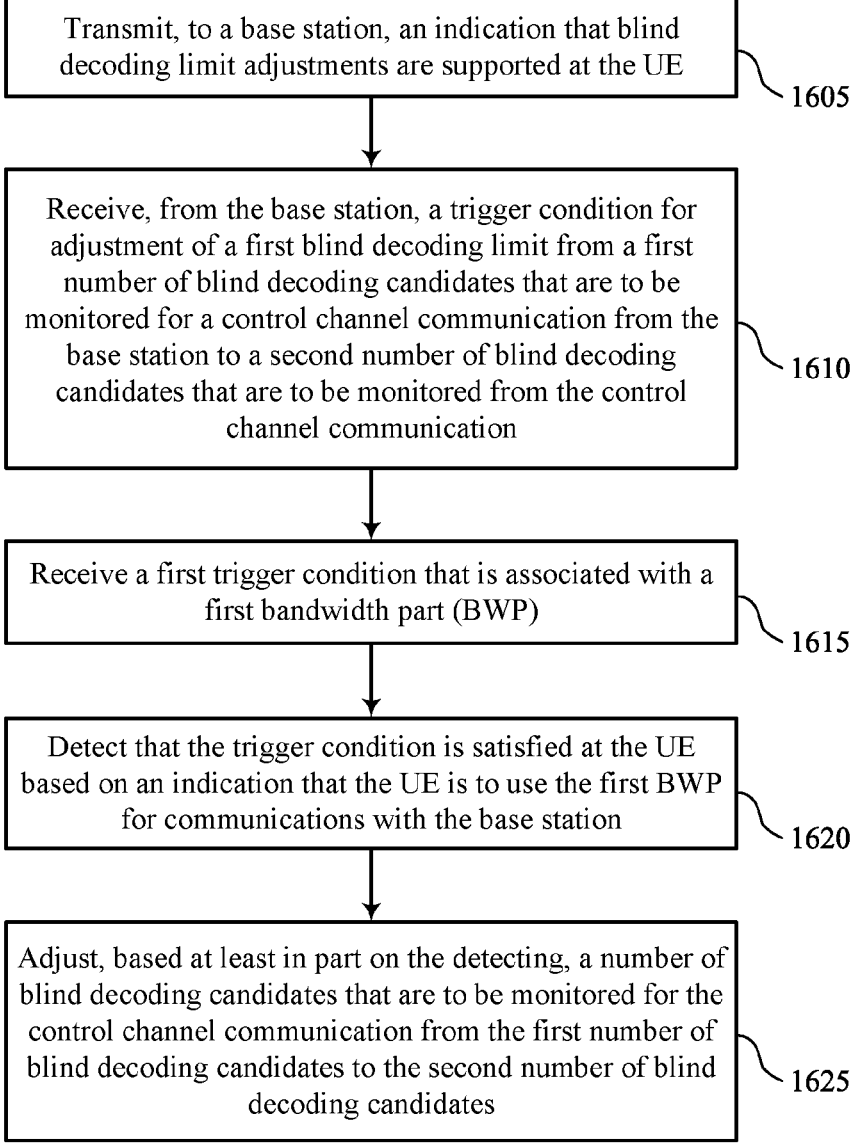

Transmit, to a base station, an indication that blind decoding limit adjustments are supported at the UE
1605

Receive, from the base station, a trigger condition for adjustment of a first blind decoding limit from a first number of blind decoding candidates that are to be monitored for a control channel communication from the base station to a second number of blind decoding candidates that are to be monitored from the control channel communication
1610

Receive a first trigger condition that is associated with a first bandwidth part (BWP)
1615

Detect that the trigger condition is satisfied at the UE based on an indication that the UE is to use the first BWP for communications with the base station
1620

Adjust, based at least in part on the detecting, a number of blind decoding candidates that are to be monitored for the control channel communication from the first number of blind decoding candidates to the second number of blind decoding candidates
1625

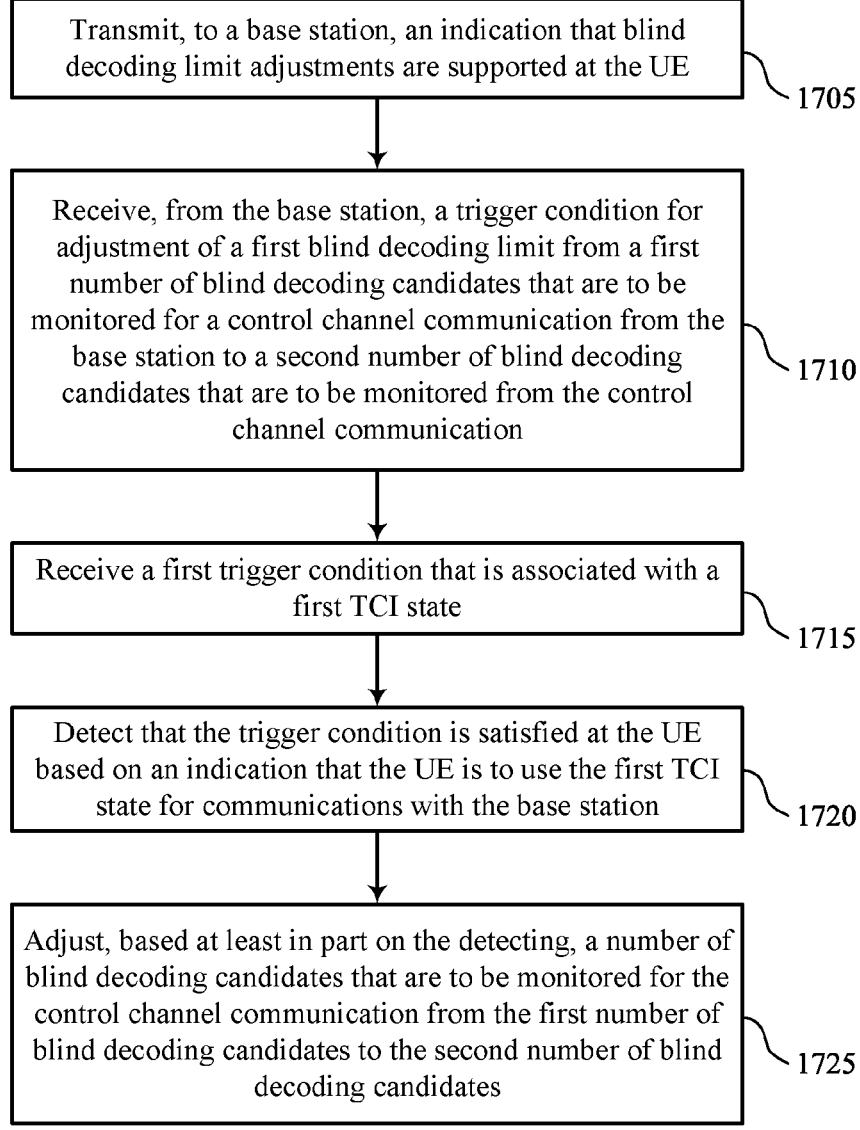

Transmit, to a base station, an indication that blind decoding limit adjustments are supported at the UE

1705

Receive, from the base station, a trigger condition for adjustment of a first blind decoding limit from a first number of blind decoding candidates that are to be monitored for a control channel communication from the base station to a second number of blind decoding candidates that are to be monitored from the control channel communication

1710

Receive a first trigger condition that is associated with a first TCI state

1715

Detect that the trigger condition is satisfied at the UE based on an indication that the UE is to use the first TCI state for communications with the base station

1720

Adjust, based at least in part on the detecting, a number of blind decoding candidates that are to be monitored for the control channel communication from the first number of blind decoding candidates to the second number of blind decoding candidates

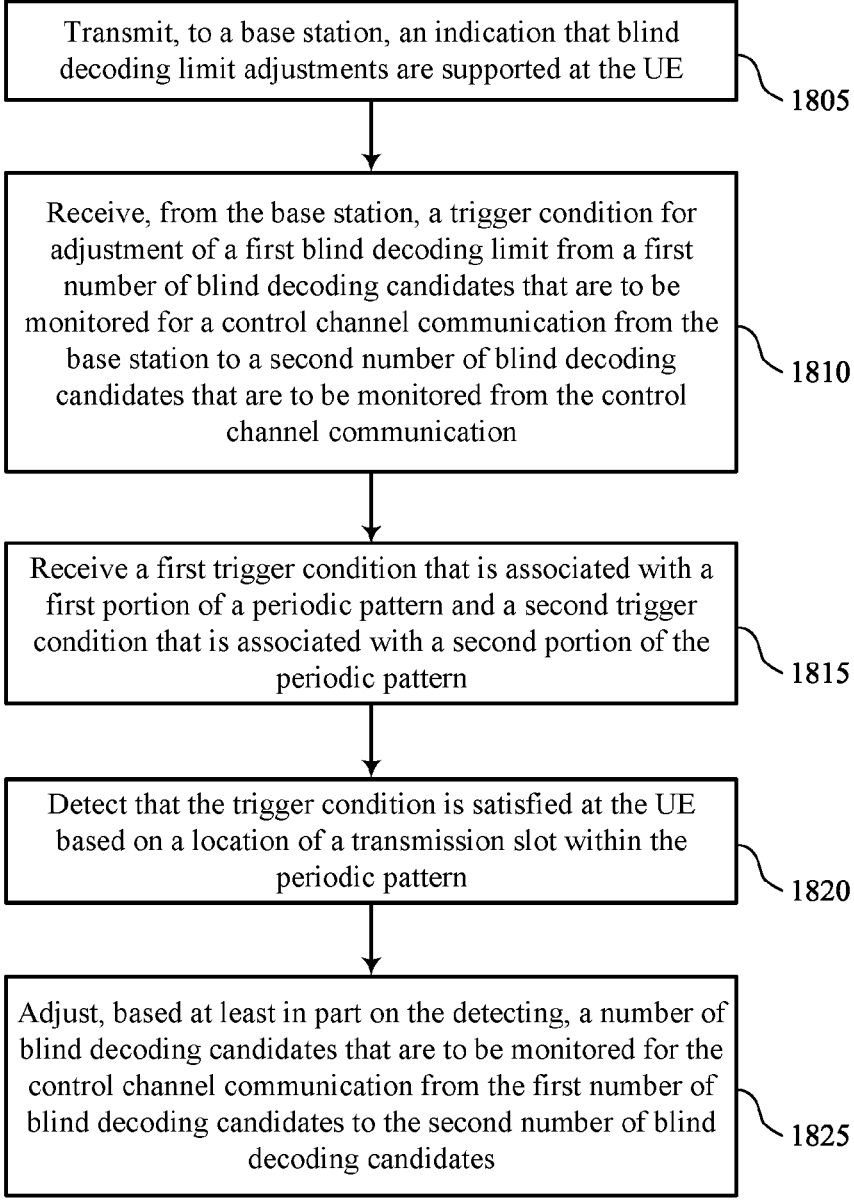

Transmit, to a base station, an indication that blind decoding limit adjustments are supported at the UE

1805

Receive, from the base station, a trigger condition for adjustment of a first blind decoding limit from a first number of blind decoding candidates that are to be monitored for a control channel communication from the base station to a second number of blind decoding candidates that are to be monitored from the control channel communication

1810

Receive a first trigger condition that is associated with a first portion of a periodic pattern and a second trigger condition that is associated with a second portion of the periodic pattern

1815

Detect that the trigger condition is satisfied at the UE based on a location of a transmission slot within the periodic pattern

1820

Adjust, based at least in part on the detecting, a number of blind decoding candidates that are to be monitored for the control channel communication from the first number of blind decoding candidates to the second number of blind decoding candidates

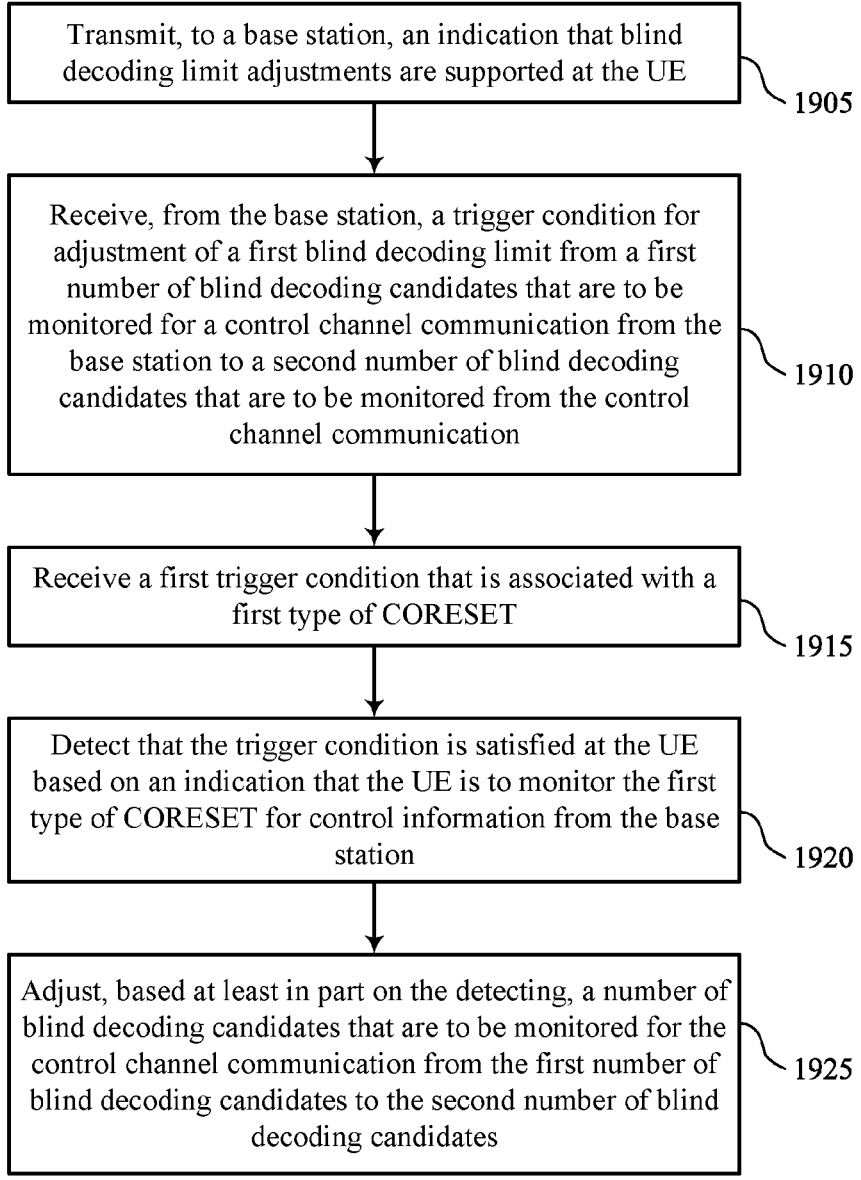

Transmit, to a base station, an indication that blind decoding limit adjustments are supported at the UE

1905

Receive, from the base station, a trigger condition for adjustment of a first blind decoding limit from a first number of blind decoding candidates that are to be monitored for a control channel communication from the base station to a second number of blind decoding candidates that are to be monitored from the control channel communication

1910

Receive a first trigger condition that is associated with a first type of CORESET

1915

Detect that the trigger condition is satisfied at the UE based on an indication that the UE is to monitor the first type of CORESET for control information from the base station

1920

Adjust, based at least in part on the detecting, a number of blind decoding candidates that are to be monitored for the control channel communication from the first number of blind decoding candidates to the second number of blind decoding candidates

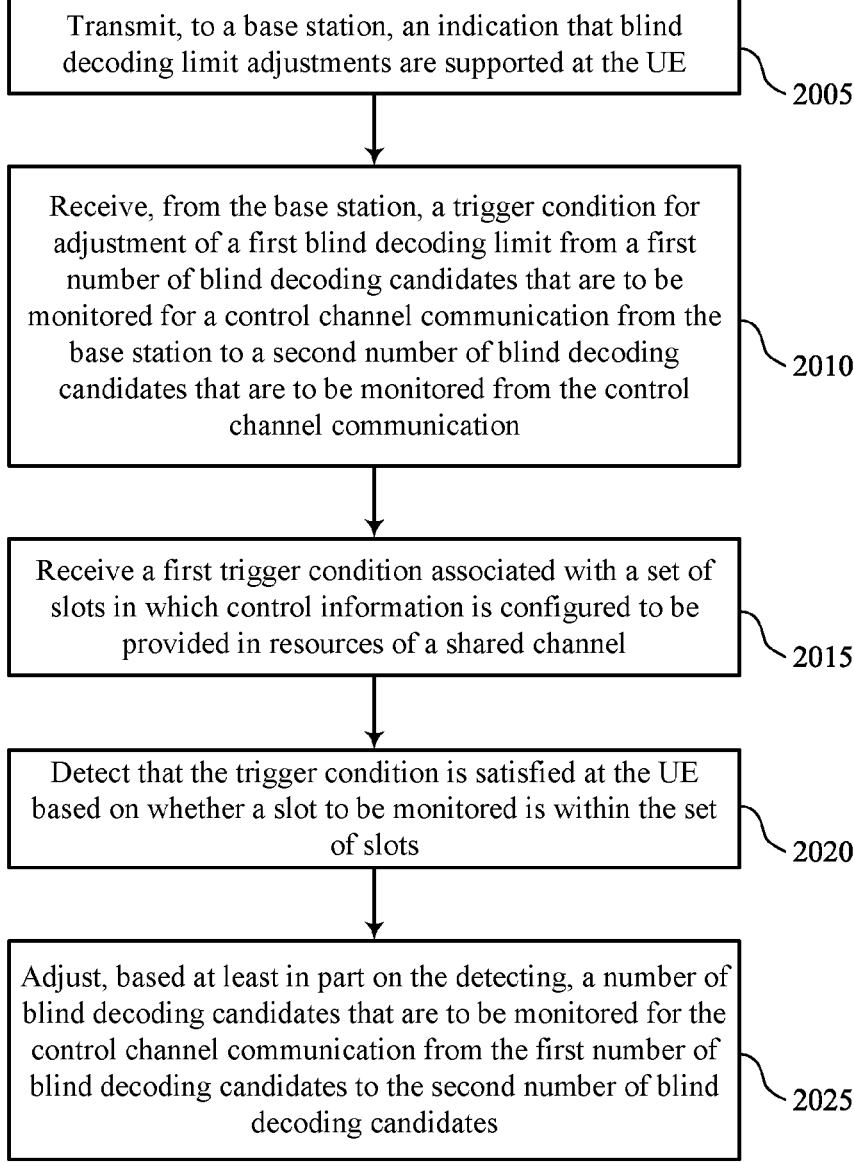

Transmit, to a base station, an indication that blind decoding limit adjustments are supported at the UE

2005

Receive, from the base station, a trigger condition for adjustment of a first blind decoding limit from a first number of blind decoding candidates that are to be monitored for a control channel communication from the base station to a second number of blind decoding candidates that are to be monitored from the control channel communication

2010

Receive a first trigger condition associated with a set of slots in which control information is configured to be provided in resources of a shared channel

2015

Detect that the trigger condition is satisfied at the UE based on whether a slot to be monitored is within the set of slots

2020

Adjust, based at least in part on the detecting, a number of blind decoding candidates that are to be monitored for the control channel communication from the first number of blind decoding candidates to the second number of blind decoding candidates

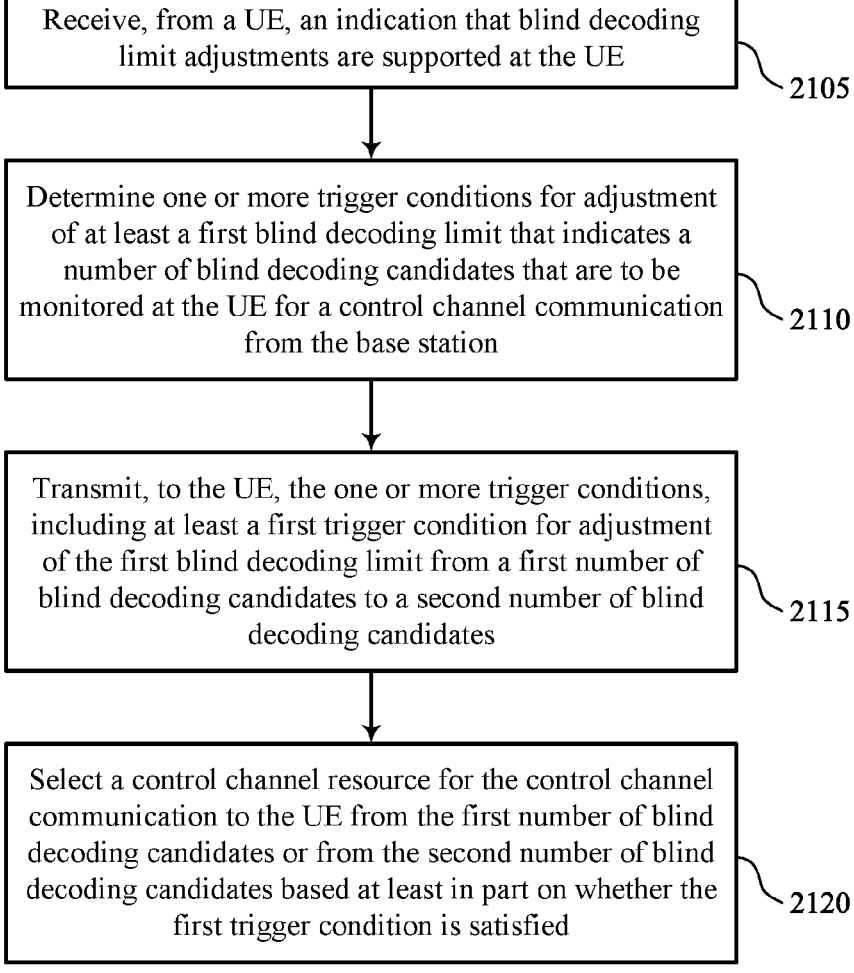

Receive, from a UE, an indication that blind decoding limit adjustments are supported at the UE
2105

Determine one or more trigger conditions for adjustment of at least a first blind decoding limit that indicates a number of blind decoding candidates that are to be monitored at the UE for a control channel communication from the base station
2110

Transmit, to the UE, the one or more trigger conditions, including at least a first trigger condition for adjustment of the first blind decoding limit from a first number of blind decoding candidates to a second number of blind decoding candidates
2115

Select a control channel resource for the control channel communication to the UE from the first number of blind decoding candidates or from the second number of blind decoding candidates based at least in part on whether the first trigger condition is satisfied
2120

BLIND DECODING LIMIT TECHNIQUES FOR WIRELESS COMMUNICATIONS

CROSS REFERENCE

The present application is a 371 national stage filing of International PCT Application No. PCT/CN2021/071188 by REN et al. entitled "BLIND DECODING LIMIT TECHNIQUES FOR WIRELESS COMMUNICATIONS," filed Jan. 12, 2021, which is assigned to the assignee hereof, and which is expressly incorporated by reference in its entirety herein.

FIELD OF TECHNOLOGY

The following relates to wireless communications, including blind decoding limit techniques for wireless communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless systems, base stations may transmit control information to UEs using a downlink control channel (e.g. a physical downlink control channel (PDCCH)). In some cases, UEs may monitor a number of resources within the downlink control channel based on one or more search spaces configured at the UE. In such cases, each UE may perform blind decoding on multiple possible downlink resources that may contain control information for the UE in accordance with the configured search space. If a UE detects control information that indicates an identification of the UE (e.g., based on the downlink communication being scrambled by the UE's radio network temporary identification (RNTI)), the UE may decode and process the control information. Such blind decoding can consume a relatively large amount of processing resources and processing power at the UE, and thus efficient techniques for blind decoding may help enhance UE efficiency and reduce power consumption.

SUMMARY

The described techniques relate to improved methods, systems, devices, and apparatuses that support blind decoding limit techniques for wireless communications. In various aspects, a user equipment (UE) may receive configuration information from a base station that provides one or more conditions that may trigger an adjustment to a number of blind decoding candidates that are to be monitored at the UE for control information. In some cases, the UE may provide a capability indication to the base station that identifies the UE as capable of performing adjustments to blind decoding limits, and the base station may determine one or multiple trigger conditions that may trigger the adjustment to the number of blind decoding candidates at the UE.

In some cases, a nominal number of blind decoding candidates may be configured at the UE, and the adjustment to the number of blind decoding candidates may reduce the number of blind decoding candidates from the nominal number, thus allowing the UE to perform blind decoding using less processing power, less time, or both. In other cases, the adjustment may increase the number of blind decoding candidates from the nominal number, which may allow for additional UEs to receive control information from the base station within a time period compared to the nominal number. In some cases, the trigger conditions may include one or more of a bandwidth part (BWP) change at the UE, a beam change at the UE, a periodic set of slots, a control resource set (CORESET) that is monitored (e.g., a dynamic or UE requested CORESET may have reduced blind decoding candidates), a presence of control channel information that is transmitted using downlink shared channel resources (e.g., piggyback DCI), or any combinations thereof. In some cases, the adjustments to the blind decoding limits may be configured by radio resource control (RRC) signaling, may be indicated in downlink control information (DCI) to the UE, may be indicated in a medium access control (MAC) control element (CE), or any combinations thereof.

A method for wireless communication at a user equipment (UE) is described. The method may include transmitting, to a base station, an indication that blind decoding limit adjustments are supported at the UE, receiving, from the base station, a trigger condition for adjustment of a first blind decoding limit from a first number of blind decoding candidates that are to be monitored for a control channel communication from the base station to a second number of blind decoding candidates that are to be monitored from the control channel communication, detecting that the trigger condition is satisfied at the UE, and adjusting, based on the detecting, a number of blind decoding candidates that are to be monitored for the control channel communication from the first number of blind decoding candidates to the second number of blind decoding candidates.

An apparatus for wireless communication at a UE is described. The apparatus may include a processor, memory in electronic communication with the processor, and instructions stored in the memory. The instructions may be executable by the processor to cause the apparatus to transmit, to a base station, an indication that blind decoding limit adjustments are supported at the UE, receive, from the base station, a trigger condition for adjustment of a first blind decoding limit from a first number of blind decoding candidates that are to be monitored for a control channel communication from the base station to a second number of blind decoding candidates that are to be monitored from the control channel communication, detect that the trigger condition is satisfied at the UE, and adjusting, base at least in part on the detecting, a number of blind decoding candidates that are to be monitored for the control channel communication from the first number of blind decoding candidates to the second number of blind decoding candidates.

Another apparatus for wireless communication at a UE is described. The apparatus may include means for transmitting, to a base station, an indication that blind decoding limit adjustments are supported at the UE, means for receiving, from the base station, a trigger condition for adjustment of a first blind decoding limit from a first number of blind decoding candidates that are to be monitored for a control channel communication from the base station to a second number of blind decoding candidates that are to be monitored from the control channel communication, means for detecting that the trigger condition is satisfied at the UE, and means for adjusting, based on the detecting, a number of blind decoding candidates that are to be monitored for the control channel communication from the first number of blind decoding candidates to the second number of blind decoding candidates.

A non-transitory computer-readable medium storing code for wireless communication at a UE is described. The code may include instructions executable by a processor to transmit, to a base station, an indication that blind decoding limit adjustments are supported at the UE, receive, from the base station, a trigger condition for adjustment of a first blind decoding limit from a first number of blind decoding candidates that are to be monitored for a control channel communication from the base station to a second number of blind decoding candidates that are to be monitored from the control channel communication, detect that the trigger condition is satisfied at the UE, and adjusting, base at least in part on the detecting, a number of blind decoding candidates that are to be monitored for the control channel communication from the first number of blind decoding candidates to the second number of blind decoding candidates.

In some examples of the method, apparatuses, and non-transitory computer-readable medium described herein, the receiving may include operations, features, means, or instructions for receiving a first trigger condition that is associated with a first BWP, and where the first trigger condition is detected based on an indication that the UE is to use the first BWP for communications with the base station. In some examples of the method, apparatuses, and non-transitory computer-readable medium described herein, the first trigger condition is configured at the UE in RRC signaling that configures a set of multiple different BWPs for communications between the UE and the base station. In some examples of the method, apparatuses, and non-transitory computer-readable medium described herein, the first trigger condition is indicated in control channel information associated with a BWP switch to the first BWP, and where the first trigger condition is provided in a same control channel information transmission that indicates the BWP switch to the first BWP, in a different control channel information transmission, or any combinations thereof.

In some examples of the method, apparatuses, and non-transitory computer-readable medium described herein, the receiving may include operations, features, means, or instructions for receiving a first trigger condition that is associated with a first transmission configuration indicator (TCI) state, and where the first trigger condition is detected based on an indication that the UE is to use the first TCI state for communications with the base station. In some examples of the method, apparatuses, and non-transitory computer-readable medium described herein, the first trigger condition is configured at the UE in RRC signaling, is indicated to the UE in a DCI transmission, or any combinations thereof.

In some examples of the method, apparatuses, and non-transitory computer-readable medium described herein, the receiving may include operations, features, means, or instructions for receiving a first trigger condition that is associated with a first portion of a periodic pattern and a second trigger condition that is associated with a second portion of the periodic pattern, and where the first trigger condition or the second trigger condition is detected based on a location of a transmission slot within the periodic pattern. In some examples of the method, apparatuses, and non-transitory computer-readable medium described herein, the periodic pattern is configured by RRC signaling, and activated or deactivated by DCI.

In some examples of the method, apparatuses, and non-transitory computer-readable medium described herein, the receiving may include operations, features, means, or instructions for receiving a first trigger condition that is associated with a first type of CORESET, where the first trigger condition is detected based on an indication that the UE is to monitor the first type of CORESET for control information from the base station, and where the first type of CORESET is a dynamic CORESET or a UE-requested CORESET.

In some examples of the method, apparatuses, and non-transitory computer-readable medium described herein, the receiving may include operations, features, means, or instructions for receiving a first trigger condition associated with a set of slots in which control information is configured to be provided in resources of a shared channel, and where the first trigger condition is detected based on whether a slot to be monitored is within the set of slots. In some examples of the method, apparatuses, and non-transitory computer-readable medium described herein, an indication of whether a slot is included in the set of slots is provided in DCI from the base station, in RRC signaling from the base station, or any combinations thereof.

In some examples of the method, apparatuses, and non-transitory computer-readable medium described herein, the indication that blind decoding limit adjustments is supported at the UE is provided in a capability indication that is transmitted to the base station, and where the capability indication includes one or more conditions that can trigger a blind decoding limit adjustment at the UE, an indication of a UE type, or any combinations thereof.

In some examples of the method, apparatuses, and non-transitory computer-readable medium described herein, the receiving may include operations, features, means, or instructions for receiving two or more trigger conditions that are associated with a corresponding two or more parameters associated with communications with the base station and where the first blind decoding limit is maintained based on a first combination of the two or more trigger conditions and the second blind decoding limit is selected based on a second combination of the two or more trigger conditions. In some examples of the method, apparatuses, and non-transitory computer-readable medium described herein, the trigger condition for adjustment of a first blind decoding limit is received jointly in a conditions configuration, in downlink control information, in a MAC-CE, in RRC signaling, or any combinations thereof.

A method for wireless communication at a base station is described. The method may include receiving, from a UE, an indication that blind decoding limit adjustments are supported at the UE, determining one or more trigger conditions for adjustment of at least a first blind decoding limit that indicates a number of blind decoding candidates that are to be monitored at the UE for a control channel communication from the base station, transmitting, to the UE, the one or more trigger conditions, including at least a first trigger condition for adjustment of the first blind decoding limit from a first number of blind decoding candidates to a second number of blind decoding candidates, and selecting a control channel resource for the control channel communication to the UE from the first number of blind decoding candidates or from the second number of blind decoding candidates based on whether the first trigger condition is satisfied.

An apparatus for wireless communication at a base station is described. The apparatus may include a processor, memory in electronic communication with the processor, and instructions stored in the memory. The instructions may be executable by the processor to cause the apparatus to receive, from a UE, an indication that blind decoding limit adjustments are supported at the UE, determine one or more trigger conditions for adjustment of at least a first blind decoding limit that indicates a number of blind decoding candidates that are to be monitored at the UE for a control channel communication from the base station, transmit, to the UE, the one or more trigger conditions, including at least a first trigger condition for adjustment of the first blind decoding limit from a first number of blind decoding candidates to a second number of blind decoding candidates, and select a control channel resource for the control channel communication to the UE from the first number of blind decoding candidates or from the second number of blind decoding candidates based on whether the first trigger condition is satisfied.

Another apparatus for wireless communication at a base station is described. The apparatus may include means for receiving, from a UE, an indication that blind decoding limit adjustments are supported at the UE, means for determining one or more trigger conditions for adjustment of at least a first blind decoding limit that indicates a number of blind decoding candidates that are to be monitored at the UE for a control channel communication from the base station, means for transmitting, to the UE, the one or more trigger conditions, including at least a first trigger condition for adjustment of the first blind decoding limit from a first number of blind decoding candidates to a second number of blind decoding candidates, and means for selecting a control channel resource for the control channel communication to the UE from the first number of blind decoding candidates or from the second number of blind decoding candidates based on whether the first trigger condition is satisfied.

A non-transitory computer-readable medium storing code for wireless communication at a base station is described. The code may include instructions executable by a processor to receive, from a UE, an indication that blind decoding limit adjustments are supported at the UE, determine one or more trigger conditions for adjustment of at least a first blind decoding limit that indicates a number of blind decoding candidates that are to be monitored at the UE for a control channel communication from the base station, transmit, to the UE, the one or more trigger conditions, including at least a first trigger condition for adjustment of the first blind decoding limit from a first number of blind decoding candidates to a second number of blind decoding candidates, and select a control channel resource for the control channel communication to the UE from the first number of blind decoding candidates or from the second number of blind decoding candidates based on whether the first trigger condition is satisfied.

In some examples of the method, apparatuses, and non-transitory computer-readable medium described herein, the first trigger condition is associated with a first BWP, and where the first trigger condition is satisfied based on an indication that the UE is to use the first BWP for communications with the base station. In some examples of the method, apparatuses, and non-transitory computer-readable medium described herein, the first trigger condition is indicated in a control channel information transmission associated a BWP switch to the first BWP, and where the first trigger condition is provided in a same control channel information transmission that indicates the BWP switch to the first BWP, in a different control channel information transmission, or any combinations thereof.

In some examples of the method, apparatuses, and non-transitory computer-readable medium described herein, the first trigger condition is associated with a first TCI state, and where the first trigger condition is satisfied based on an indication that the UE is to use the first TCI state for communications with the base station. In some examples of the method, apparatuses, and non-transitory computer-readable medium described herein, the first trigger condition is configured at the UE in RRC signaling, is indicated to the UE in a DCI transmission, or any combinations thereof.

In some examples of the method, apparatuses, and non-transitory computer-readable medium described herein, the first trigger condition is associated with a first portion of a periodic pattern and a second trigger condition is associated with a second portion of the periodic pattern, and where the first trigger condition or the second trigger condition is satisfied based on a location of a transmission slot within the periodic pattern.

In some examples of the method, apparatuses, and non-transitory computer-readable medium described herein, the first trigger condition is associated with a first type of CORESET, where the first trigger condition is satisfied based on an indication that the UE is to monitor the first type of CORESET for control information from the base station and where the first type of CORESET is a dynamic CORESET or a UE-requested CORESET.

In some examples of the method, apparatuses, and non-transitory computer-readable medium described herein, the first trigger condition is associated with a set of slots in which control information is configured to be provided in resources of a shared channel, and where the first trigger condition is satisfied based on whether a slot to be monitored is within the set of slots.

In some examples of the method, apparatuses, and non-transitory computer-readable medium described herein, the indication that blind decoding limit adjustments is supported at the UE is provided in a capability indication that is received from the UE, and where the capability indication includes one or more parameters that can trigger a blind decoding limit adjustment at the UE, an indication of a UE type, or any combinations thereof.

In some examples of the method, apparatuses, and non-transitory computer-readable medium described herein, two or more trigger conditions is associated with a corresponding two or more parameters associated with communications with the base station and where the first blind decoding limit is maintained based on a first combination of the two or more trigger conditions and the second blind decoding limit is selected based on a second combination of the two or more trigger conditions. In some examples of the method, apparatuses, and non-transitory computer-readable medium described herein, the trigger condition for adjustment of a first blind decoding limit is received jointly in a conditions configuration, in downlink control information, in a MAC-CE, in radio resource control signaling, or any combinations thereof.

BRIEF DESCRIPTION OF THE DRAWINGS

FIGS. 15 through 21 show flowcharts illustrating methods that support blind decoding limit techniques for wireless communications in accordance with aspects of the present disclosure.

DETAILED DESCRIPTION

Figure 1:
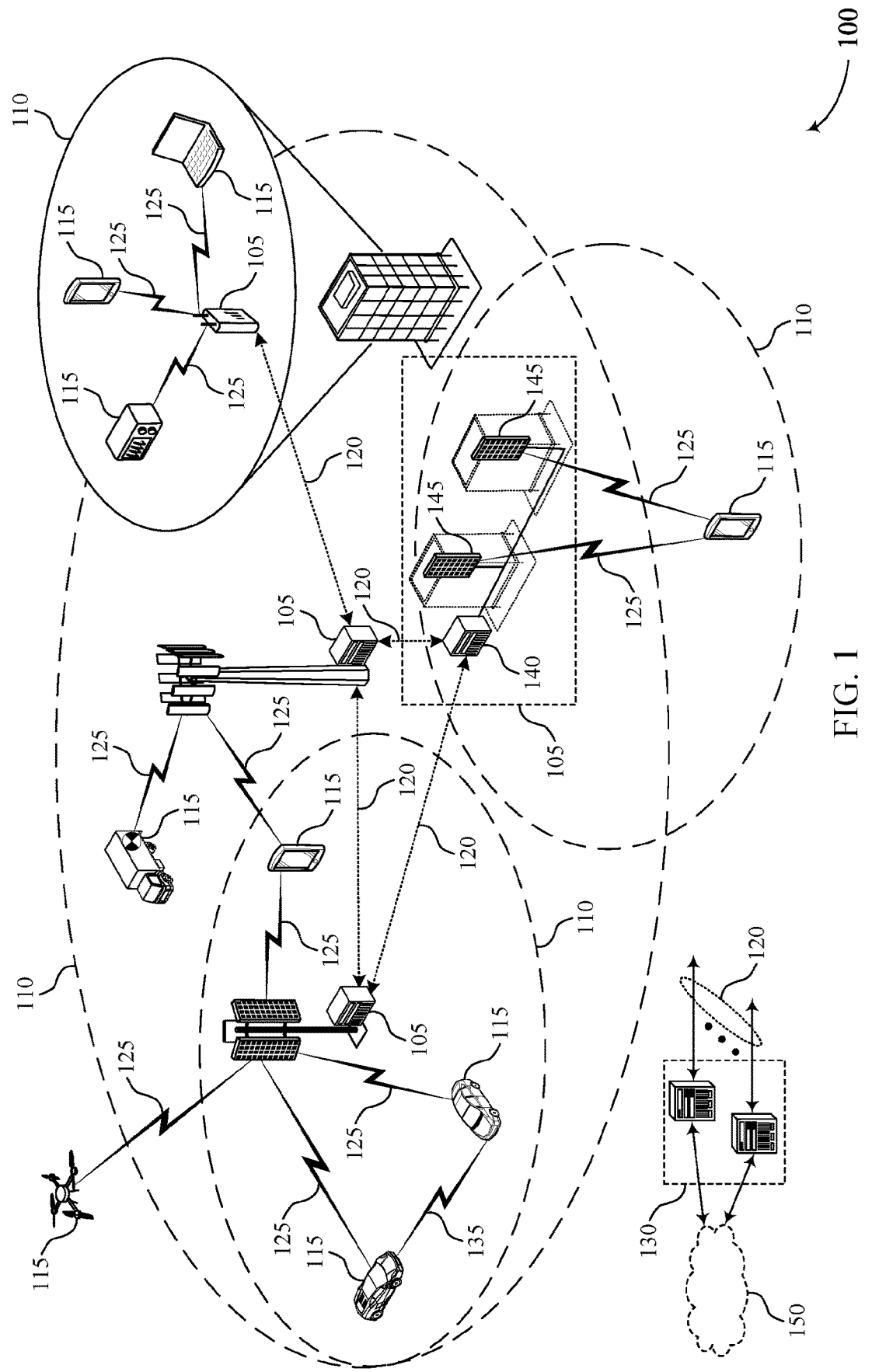
FIG. 1 illustrates an example of a wireless communications system that supports blind decoding limit techniques for wireless communications in accordance with aspects of the present disclosure.

In some wireless communications systems, base stations may transmit control information to a user equipment (UE) using a downlink control channel (e.g. a physical downlink control channel (PDCCH)). In order to monitor for control information UEs may monitor one or more search spaces within downlink control channel resources. In such cases, each UE may perform blind decoding on multiple possible downlink resources that may contain control information for the UE in accordance with the configured search space. If a UE detects control information that indicates an identification of the UE (e.g., based on the downlink communication being scrambled by the UE's radio network temporary identification (RNTI)), the UE may decode and process the control information. Such blind decoding can consume a relatively large amount of processing resources and processing power at the UE.

Such blind decoding may consume processing resources and power for any type of UE, but can be more burdensome in certain types of devices, such as low cost devices that may have reduced capabilities. For example, in some NR deployments reduced-capability (RedCap) UEs or NR-light UEs may be deployed that have lower cost and reduced capability. For example, compared to a full capability UE, such reduced-capability UEs may have a reduced number of antennas, reduced transmit/receive bandwidth, limited battery capacity, reduced processing capability of PDCCH blind decoding, limited storage capacity, or any combinations thereof. Such reduced-capability UEs may be used in, for example, Internet of things (IoT) use cases, such as smart wearable devices, industrial sensors, video surveillance devices, and the like. Thus, in some NR cells, multiple types of UEs may be present, including regular UEs and reduced-capability UEs.

As indicated, in the PDCCH reception, a UE may perform blind decoding because the UE may not know a number of control channel elements (CCEs) occupied by the current PDCCH, what downlink control information (DCI) format information is transmitted, and where the information it needs is located. However, as part of the blind decoding process, the UE knows what information it is expecting, and UE is aware of its radio network temporary identifier (RNTI) value. For example, in an idle state, the UE expects paging or system information (SI) communications. Among other examples, upon initiating a random access channel (RACH) procedure, the UE expects a RACH response, and when there is uplink data in the buffer waiting to be sent the UE expects an uplink grant. For different expected information, the UE uses the corresponding RNTI to perform a cyclic redundancy check (CRC) on the received transport block (TB) that has the CRC scrambled with the respective RNTI. If the CRC check is successful, then the UE knows that this information is what it needs, and will further derive the content of the message (e.g., the content of a DCI message). If the UE fails to decode the PDCCH, it will keep attempting to decode the PDCCH using a different set of PDCCH blind decoding candidates in the upcoming PDCCH monitoring occasion.

A PDCCH candidate may be determined by the CCE aggregation level. For some DCI formats, one CCE may not be enough to take all DCI information, so the CCE aggregation level is defined to combine some CCE as one PDCCH candidate. In some cases, a UE does not attempt to decode every PDCCH candidate, but instead uses a search space (SS) that may allow a scheduler at the base station to have some flexibility in selection of PDCCH resources, and at the same time to maintain a manageable number of blind decoding attempts by the UE. In some cases, the SS set includes two types of SSs, namely a common SS set and UE-specific SS set. In some deployments, a UE may decode PDCCH using five UE-specific search space aggregation levels (1, 2, 4, 8, 16) and 3 common search space aggregation levels (4, 8, 16), which may provide a number of PDCCH candidates within the search space that are blind decoding candidates. UE PDCCH blind decoding capability may be defined for monitoring PDCCH(s) of the UE, where the exact aggregation levels and number of decoding candidates per aggregation level are configurable, and this can be considered as a benchmark for the base station when configuring aggregation levels and/or the number of PDCCH candidates for each aggregation level.

As indicated, additional blind decoding candidates may result in a UE consuming more power and using more processing resources compared to cases where fewer blind decoding candidates may be present. For example, fewer blind decoding candidates may would reduce the number of blind decoding attempts (e.g., PDCCH candidates processing) in PDCCH monitoring. Further, fewer blind decoding candidates may result in the PDCCH decoding process being completed more quickly, allowing the UE to enter a microsleep period more quickly. However, blind decoding limit reductions may impose constraints on a base station scheduler, and limit scheduling flexibility which can potentially increase latency and blocking probability (e.g., the probability that a DCI for a UE will be blocked by another DCI of another UE). A higher blocking probability due to a smaller blind decoding limit may result in a higher latency, as well as negative impact on energy efficiency. Thus, providing a reduced blind decoding limit for certain UEs may be beneficial for the UE from a blind decoding perspective, but may limit the scheduling flexibility of a base station and result in increased latency and reduced energy efficiency. For example, a blind decoding limit reduction may cause the performance loss in scenarios where a relatively large number of UEs are present, as a smaller blind decoding limit would increase PDCCH blocking probability (BP). Further, BP may depend on various factors such as a number of UEs which need to be scheduled (e.g., this may depend on the UE's traffic), a control resource set (CORE-SET) size (e.g., number of CCEs), a number of PDCCH candidates, and PDCCH link performance/coverage (e.g., which affects aggregation level). Thus, simply providing some UEs (e.g., RedCap UEs) with a reduced blind decoding limit may not provide desired efficiencies in some situations.

Various aspects of the present disclosure provide techniques to enhance the efficiency by providing adjustments to blind decoding limits in some cases where one or more conditions are met that would provide increased efficiencies through blind decoding limit reductions. In various aspects, a UE may receive configuration information from a base station that provides one or more conditions that may trigger an adjustment to a number of blind decoding candidates. In some cases, the UE may provide a capability indication to the base station that identifies the UE as capable of performing adjustments to blind decoding limits, and the base station may determine one or multiple trigger conditions that may trigger the adjustment to the number of blind decoding candidates at the UE.

In some cases, a nominal number of blind decoding candidates may be configured at the UE, and the adjustment to the number of blind decoding candidates may reduce the number of blind decoding candidates from the nominal number, thus allowing the UE to perform blind decoding using less processing power, less time, or both. In other cases, the adjustment may increase the number of blind decoding candidates from the nominal number, which may allow for additional UEs to receive control information from the base station within a time period compared to the nominal number of blind decoding candidates. In some cases, the trigger conditions may include one or more of a bandwidth part (BWP) change at the UE, a beam change at the UE, whether a slot in the search space is in a periodic set of slots, a CORESET that is monitored (e.g., a dynamic or UE requested CORESET may have reduced blind decoding candidates), a presence of control channel information that is transmitted using downlink shared channel resources (e.g., piggyback DCI), or any combinations thereof. In some cases, the adjustments to the blind decoding limits may be configured by radio resource control (RRC) signaling, may be indicated in DCI to the UE, may be indicated in a medium access control (MAC) control element (CE), or any combinations thereof.

Particular aspects of the subject matter described herein may be implemented to realize one or more advantages. The described techniques may support improvements in the blind decoding framework to allow efficient usage of UE resources and adjustment of a number of blind decoding candidates based on conditions at a base station and UE. Such techniques may thereby reduce power consumption and processing resource usage, and improve reliability of wireless communications, among other advantages. As such, supported techniques may include improved network operations and, in some examples, may promote network efficiencies, among other benefits.

Aspects of the disclosure are initially described in the context of wireless communications systems and process flows. Aspects of the disclosure are further illustrated by and described with reference to apparatus diagrams, system diagrams, and flowcharts that relate to blind decoding limit techniques for wireless communications.

FIG. 1 illustrates an example of a wireless communications system 100 that supports blind decoding limit techniques for wireless communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs

115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

In some cases, one or more UEs 115 may perform blind decoding of PDCCH candidates within one or more search spaces to attempt to decode DCI from a base station 105. In some cases, some UEs 115 and base stations 105 may make adjustments to blind decoding limits in cases where one or more conditions are met that would provide increased efficiencies through blind decoding limit reductions. In some cases, a UE 115 may receive configuration information from a base station 105 that provides one or more conditions that may trigger an adjustment to a number of blind decoding candidates. In some cases, the UE 115 may provide a capability indication to the base station 105 that identifies the UE 115 as capable of performing adjustments to blind decoding limits, and the base station 105 may determine one or multiple trigger conditions that may trigger the adjustment to the number of blind decoding candidates at the UE 115.

Figure 2:
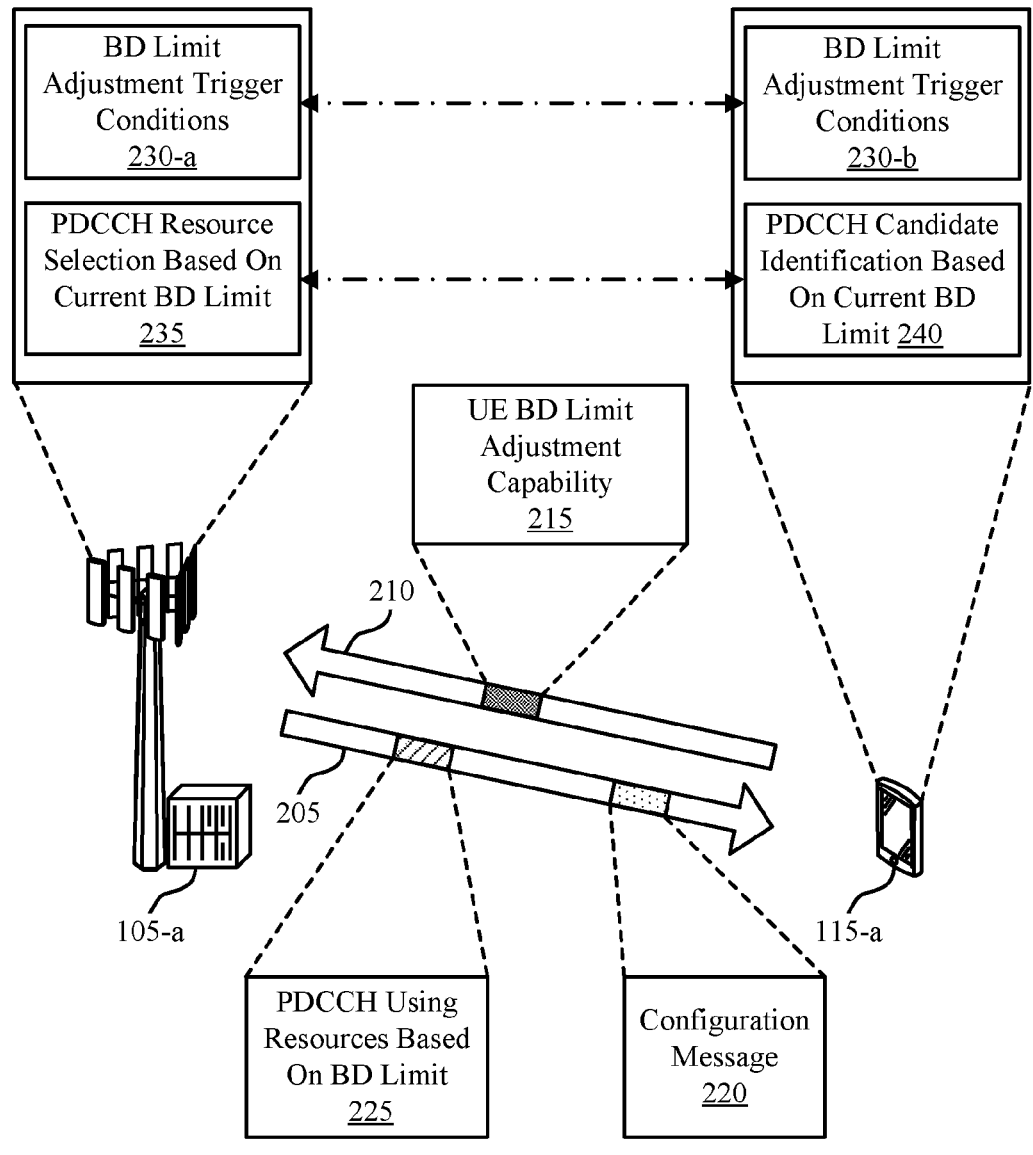
FIG. 2 illustrates an example of a portion of a wireless communications system that supports blind decoding limit techniques for wireless communications in accordance with aspects of the present disclosure.

FIG. 2 illustrates an example of a wireless communications system 200 that supports blind decoding limit techniques for wireless communications in accordance with aspects of the present disclosure. In some examples, wireless communications system 200 may implement aspects of wireless communications system 100. Wireless communications system 200 may include a base station 105-*a* and a UE 115-*a* which may be examples of a base station 105 and UEs 115, respectively, described with reference to FIG. 1.

In this example, the base station 105-*a* may transmit downlink communications to the UE 115-*a* via a downlink carrier 205 and the UE 115-*a* may transmit uplink communications to the base station 105-*a* via uplink carrier 210. While this example illustrates a single downlink carrier 205 and a single uplink carrier 210, in other cases the UE 115-*a* may be configured for with carrier aggregation and use multiple uplink or downlink carriers. Further, while various examples discussed herein reference communications with a single base station 105-*a*, techniques as discussed herein may be applied in cases where different base stations 105-*a* or multiple TRPs associated with a base station provide communications with the UE 115-*a*.

In some cases, the UE 115-*a* may transmit a capability indication 215 to the base station 105-*a*, that indicates that the UE 115-*a* has a capability to perform blind decoding limit adjustments. The base station 105-*a* may transmit a configuration message 220 to the UE 115-*a* which may configure one or more conditions that are to trigger an adjustment to blind decoding limits at the UE 115-*a*. In some cases, the configuration message 220 may be transmitted responsive to the capability indication 215, and in other cases the configuration message 220 may be transmitted irrespective of whether the UE 115-*a* transmits the capability indication 215 or based on one or more other parameters that implicitly indicate that the UE 115-*a* is capable of adjusting blind decoding limits. Based on the blind decoding limits, the base station 105-*a* may select one or more PDCCH resources for transmission of a PDCCH communication 225, which may be received at the UE 115-*a* using blind decoding procedures.

In some cases, the configuration message 220 may provide information for one or more blind decoding limit adjustment trigger conditions 230. In such cases, the base station 105-*a* may use blind decoding limit adjustment triggers conditions 230-*a*, and the UE 115-*a* may use blind decoding limit adjustment triggers conditions 230-*b*. The UE 115-*a* and base station 105-*a* may use a nominal blind decoding limit in the event that none of the blind decoding limit adjustment trigger conditions 230 are met, and may perform an adjustment to the blind decoding limits in the event that one or more of the trigger conditions 230 are met. Various examples of adjustments to blind decoding limits are discussed in more detail with reference to FIGS. 3 through 5. The base station 105-*a*, when transmitting the PDCCH communication 225, may perform a PDCCH resource selection 235 based on the current blind decoding limit, by selecting a PDCCH resource within a configured search space in accordance with whether the nominal or adjusted blind decoding limit is being used. Likewise, the UE 115-*a* may perform PDCCH candidate identification 240 based on the current blind decoding limit.

The nominal or adjusted blind decoding limits may allow the base station 105-*a* to maintain scheduling flexibility for efficient PDCCH communications with multiple UEs 115, while also providing reduced processing overhead and reduced power consumption at the UE 115-*a* when the trigger conditions are satisfied. In some cases, multiple different trigger conditions may be configured, and when one or a combination of the different trigger conditions are satisfied, the specific blind decoding limit may be triggered. In some cases, one or multiple different trigger conditions may be configured, including trigger conditions based on a BWP used for communications, a beam used for communications, a slot of the communications, whether a dynamic or UE-requested CORESET is associated with the communications, whether piggyback DCI is present in the same slot, or any combinations thereof. In some cases, when any one of the configured trigger conditions are met the blind decoding limits may be adjusted. In other cases, a combination of different trigger conditions may be used to initiate the blind decoding limit adjustments. Thus, based on whether the configured trigger limit condition(s) are met, the specific blind decoding limit for a search space may be a baseline blind decoding limit (e.g., an unadjusted blind decoding limit that is a predefined limit), a reduced blind decoding limit (e.g., an adjustment to the baseline blind decoding limit, such as a 50% reduction), or an increased blind decoding limit (e.g., an adjustment to the baseline blind decoding limit, such as a 25% increase that provides additional scheduling flexibility to a scheduler at the base station 105-*a*). In some cases, the specific blind decoding limit may be jointly configured along with the condition configuration in the configuration message 220. In other cases, a DCI may indicate the specific blind decoding limit for one or more indicated slots. Additionally or alternatively, the base station 105-*a* may define one or more rules in RRC signaling, and the UE 115-*a* may determine the specific blind decoding limit based on the trigger conditions and rules.

In some cases, the capability indication 215 may include a bit or an information element to indicate whether condition-based blind decoding limit adjustment is supported at the UE 115-*a*. In some cases, one or multiple bits or elements may be used to indicate (e.g., in the configuration message 220) which conditions are configured for the condition-based blind decoding limit adjustments (e.g., only one condition, multiple conditions, or one or more combinations of multiple conditions). In some cases, the capability may be associated with a type of the UE 115-*a* (e.g., a low-tier UE may support condition-based blind decoding BD limit adjustments).

Figure 3:
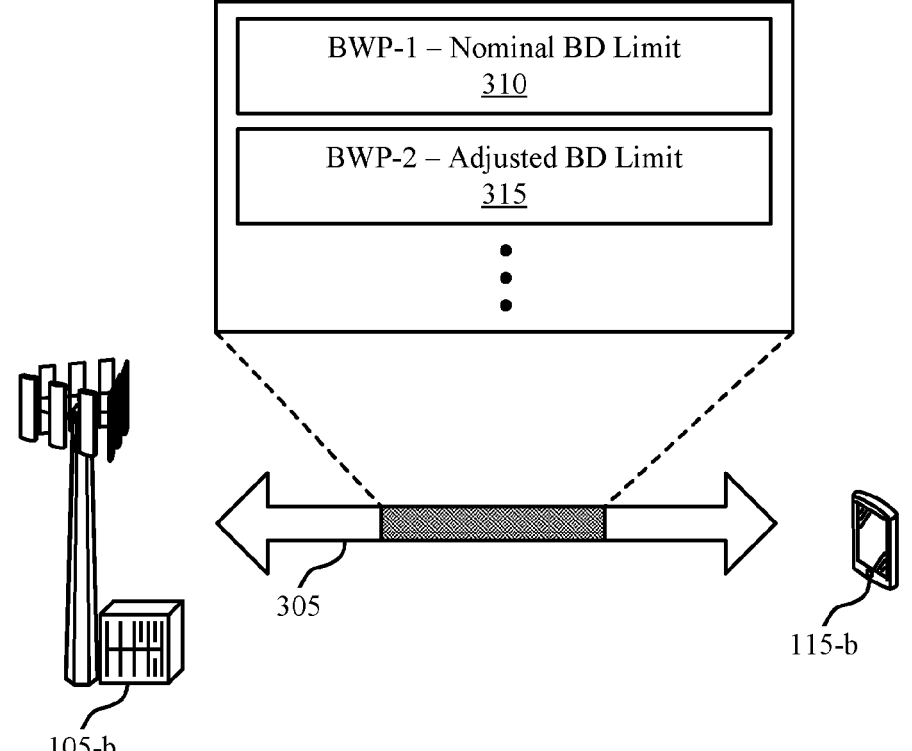
FIG. 3 illustrates an example of a bandwidth part trigger condition that supports blind decoding limit techniques for wireless communications in accordance with aspects of the present disclosure.

FIG. 3 illustrates an example of a bandwidth part trigger condition that supports blind decoding limit techniques for wireless communications in accordance with aspects of the present disclosure. In some examples, wireless communications system 300 may implement aspects of wireless communications system 100 or 200. Wireless communications system 300 may include a base station 105-*b* and a UE 115-*b* which may be examples of a base station 105 and UEs 115, respectively, described with reference to FIG. 1 or 2.

In this example, the base station 105-*b* and UE 115-*b* may communicate using communications link 305. In some cases, communications link 305 may use a BWP of multiple available BWPs, and the base station 105-*b* may configure a blind decoding limit trigger condition that is based on which BWP is to be used for communications. For example, a first BWP 310 may be associated with a nominal or baseline blind decoding limit, and a second BWP 315 may be associated with an adjusted blind decoding limit. In the event that the UE 115-*b* receives an indication to switch to the second BWP 315, the BWP switch may trigger the blind decoding limit trigger, and the UE 115-*b* may adjust the blind decoding limit.

In some cases, the base station 105-*b* may configure different blind decoding limits for different BWPs based on a number of UEs on certain BWP. For example, the first BWP 310 may have a relatively large number of UEs 115, and the second BWP 315 may have relatively fewer UEs 115 such that the blind decoding limit may be adjusted downward without risking a substantial increase in PDCCH blockage. For example, the UE 115-*b* may switch to the first BWP 310, where more UEs 115 are scheduled, and in order to provide scheduling the flexibility the blind decoding limit should be a larger value (e.g., a baseline configuration, or an increased blind decoding limit). If the UE 115-*b* switches to the second BWP 315, where fewer UEs 115 are scheduled, a reduced blind decoding limit may be configured to save the UE 115-*b* power. If the UE 115-*b* switches to the second BWP 315, where less CCEs or a smaller aggregation level are configured, the reduced blind decoding limit may be configured. Additionally or alternatively, if the UE 115-*b* switches to the second BWP 315, where a smaller CORSET size or good link performance/coverage present, the reduced blind decoding limit may be configured. Further, in some cases, if the UE 115-*b* switches to the second BWP 315, where low data rate traffic is present (e.g., which may be associated with relaxed latency requirements), the blind decoding limit can be reduced without loss of the scheduling flexibility.

In some cases, different BWPs may be configured with specific blind decoding limits, and the specific blind decoding limit may be triggered by the BWP switching. In some cases, the specific blind decoding limit may be combined with the BWP configuration in RRC signaling. In other cases, the specific blind decoding limit may be indicated by DCI for a different BWP configuration (e.g., in another DCI or in a DCI that indicates the BWP switching).

Figure 4:
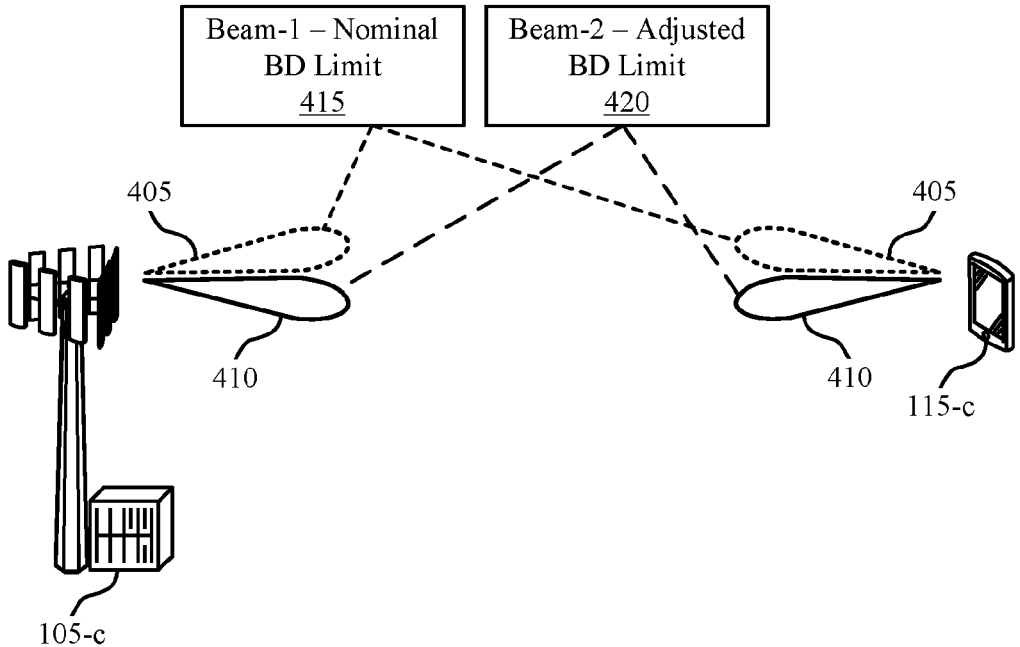
FIG. 4 illustrates an example of a transmission configuration indicator (TCI) trigger condition that supports blind decoding limit techniques for wireless communications in accordance with aspects of the present disclosure.

FIG. 4 illustrates an example of a transmission configuration indicator (TCI) trigger condition that supports blind decoding limit techniques for wireless communications in accordance with aspects of the present disclosure. In some examples, wireless communications system 400 may implement aspects of wireless communications system 100, 200, or 300. Wireless communications system 400 may include a base station 105-*c* and a UE 115-*c* which may be examples of a base station 105 and UEs 115, respectively, described with reference to FIGS. 1 through 3.

In this example, the base station 105-*c* and UE 115-*c* may communicate using beamformed communications, in which a first beam 405 and a second beam 410 may be used for communications. In some cases, the first beam 405 may be associated with a first TCI state and the second beam 410 may be associated with a second TCI state. In some cases, the base station 105-*c* may configure a blind decoding limit trigger condition that is based on which beam is to be used for communications. For example, a nominal blind decoding limit 415 may be associated with the first beam 405, and an adjusted blind decoding limit 420 may be associated with the second beam 410. In the event that the UE 115-*c* receives an indication to switch to the second beam 410, the beam switch may trigger the blind decoding limit trigger, and the UE 115-*c* may adjust the blind decoding limit.

Similarly as discussed with respect to BWPs of FIG. 3, in some cases the base station 105-*c* may configure different blind decoding limits for different beams based on a number of UEs that are using a certain TCI state. For example, if the UE 115-*c* is configured with the second beam 410, where less UEs 115 are scheduled, the adjusted blind decoding limit 420 may provide a reduced number of blind decoding candidates and may be configured to save the UE 115-*c* power. In other cases, if the UE 115-*c* is configured with the second beam 410 which has good link performance/coverage, the adjusted blind decoding limit 420 may provide a reduced number of blind decoding candidates and may be configured to save the UE 115-*c* power. In some cases, different TCI states may be configured with specific blind decoding limits, which may provide reduced or increased blind decoding limits, corresponding to different conditions. The specific blind decoding limit might be triggered by the TCI state (e.g., beam) update. In some cases, the specific blind decoding limit is combined with the TCI state configuration in RRC signaling. In other cases, the specific blind decoding limit may be indicated by DCI for different TCI state configuration. Such DCI may be the scheduling DCI, which contains the TCI state configuration, or may be another DCI.

Figure 5:
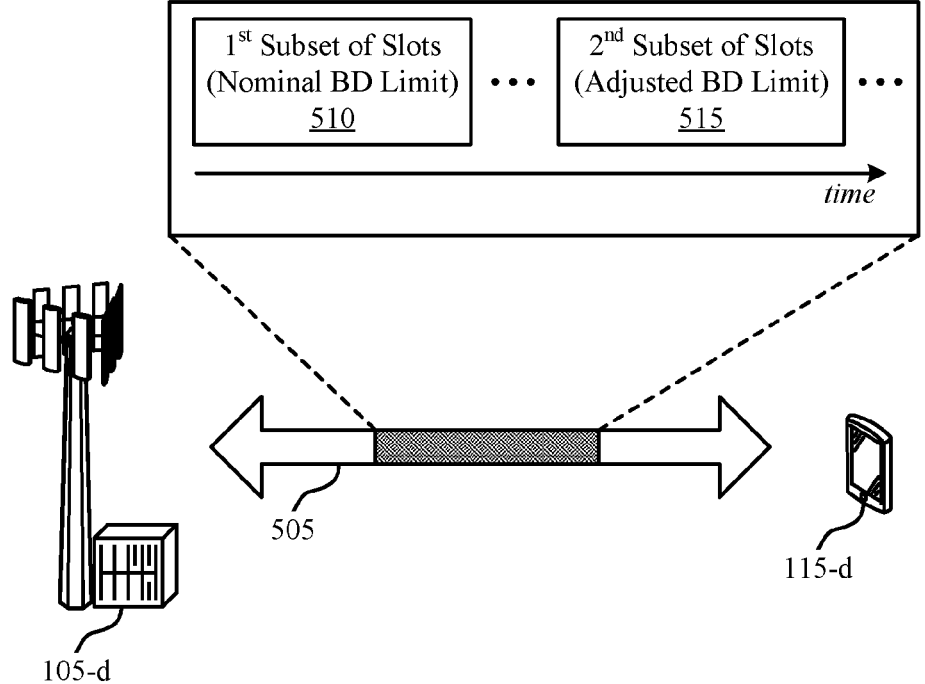
FIG. 5 illustrates an example of a pattern-based trigger condition that supports blind decoding limit techniques for wireless communications in accordance with aspects of the present disclosure.

FIG. 5 illustrates an example of a pattern-based trigger condition that supports blind decoding limit techniques for wireless communications in accordance with aspects of the present disclosure. In some examples, wireless communications system 500 may implement aspects of wireless communications system 100, 200, 300, or 400. Wireless communications system 500 may include a base station 105-*d* and a UE 115-*d* which may be examples of a base station 105 and UEs 115, respectively, described with reference to FIGS. 1 through 4.

In this example, the base station 105-*d* and UE 115-*d* may communicate using communications link 505, and blind decoding limit adjustments may be performed based on a periodic pattern. In some cases, the pattern may be based on a slot location of a PDCCH, and a first subset of slots 510 may have nominal blind decoding limits, and a second subset of slots 515 may have an adjusted blind decoding limit. In some cases, the blind decoding limits based on a pattern may be configured by RRC signaling. Such techniques may allow for adjustment of blind decoding limits based on periodic conditions that are present. For example, the UE 115-*d* may be a stationary UE 115-*d* (e.g., used in video surveillance or industrial sensors), and may experience periodic blockage rate changes due to other UEs that communicate with the base station 105-*d* according to a periodic pattern. In some cases, in the event that the UE 115-*d* experiences poor link performance during periodic slots, the baseline of the blind decoding limit may be configured to ensure the acceptable blockage rate. In some patterns, when UE 115-*d* experiences stable and good link performance during other periodic slots, a reduced blind decoding limit may be triggered. In some cases, multiple different patterns may be configured with specific blind decoding limits. Specific blind decoding limits might follow one periodical pattern, such as the second subset of slots 515 reduced a blind decoding limit, and the first subset of slots 510 with the baseline blind decoding limit. The specific blind decoding limits might be triggered by the pattern configuration (e.g., periodical), or triggered by a UE type (e.g., a video surveillance UE). In some cases, the specific blind decoding limits are combined with the pattern, configured by RRC signaling. Optionally a DCI may be used to activate and deactivate the pattern related blind decoding limit. If the pattern is deactivated, the UE 115-*d* can assume the baseline blind decoding limit.

Additionally or alternatively, the blind decoding limits may be adjusted based on a type of CORESET associated with a PDCCH. In some cases, for a dynamic CORESET or search space, the UE 115-*d* may be configured with different specific blind decoding limits. In some cases, for a dynamic CORESET or search space, the search space may be scheduled (enabled) by another DCI from another search space. For example, when the dynamic CORESET or SS is triggered, it might be with the reduced blind decoding limits. The specific blind decoding limits might be configured by another DCI from another search space, and may be triggered by the type CORESET or search space. In other cases, UE-requested CORESET or search spaces may be configured with different specific blind decoding limits. For example, if the UE 115-*d* requests a CORESET or search space, the specific blind decoding limits may be configured for the request. In some cases, the specific blind decoding limits are associated to the requested CORESET or search space, which might be preconfigured in RRC signaling, or the blind decoding limits may be dynamically configured in the DCI.

In further examples, blind decoding limit adjustments may be triggered based on whether a slot is configured for piggyback DCI (i.e., where DCI is multiplexed with a physical downlink shared channel (PDSCH) communication). For example, a first DCI portion may be transmitted within PDCCH, and may include information indicating a size of a second DCI portion transmitted within the PDSCH. If a PDCCH is in the same slot as piggyback DCI, it may satisfy a blind decoding limit adjustment trigger condition that indicates there is specific blind decoding limit. In some cases, a reduced blind decoding limit of the piggyback DCI may be indicated by the first DCI within PDCCH in the same slot. In other cases, a reduced blind decoding limit of the piggyback DCI may be indicated by another DCI in other slots. In some cases, if the slot is configured with piggyback DCI, there may be specific blind decoding limits in the slot, which may be indicated by another DCI, by RRC signaling, combined with the piggyback configuration, in a MAC-CE, or any combinations thereof.

Figure 6:
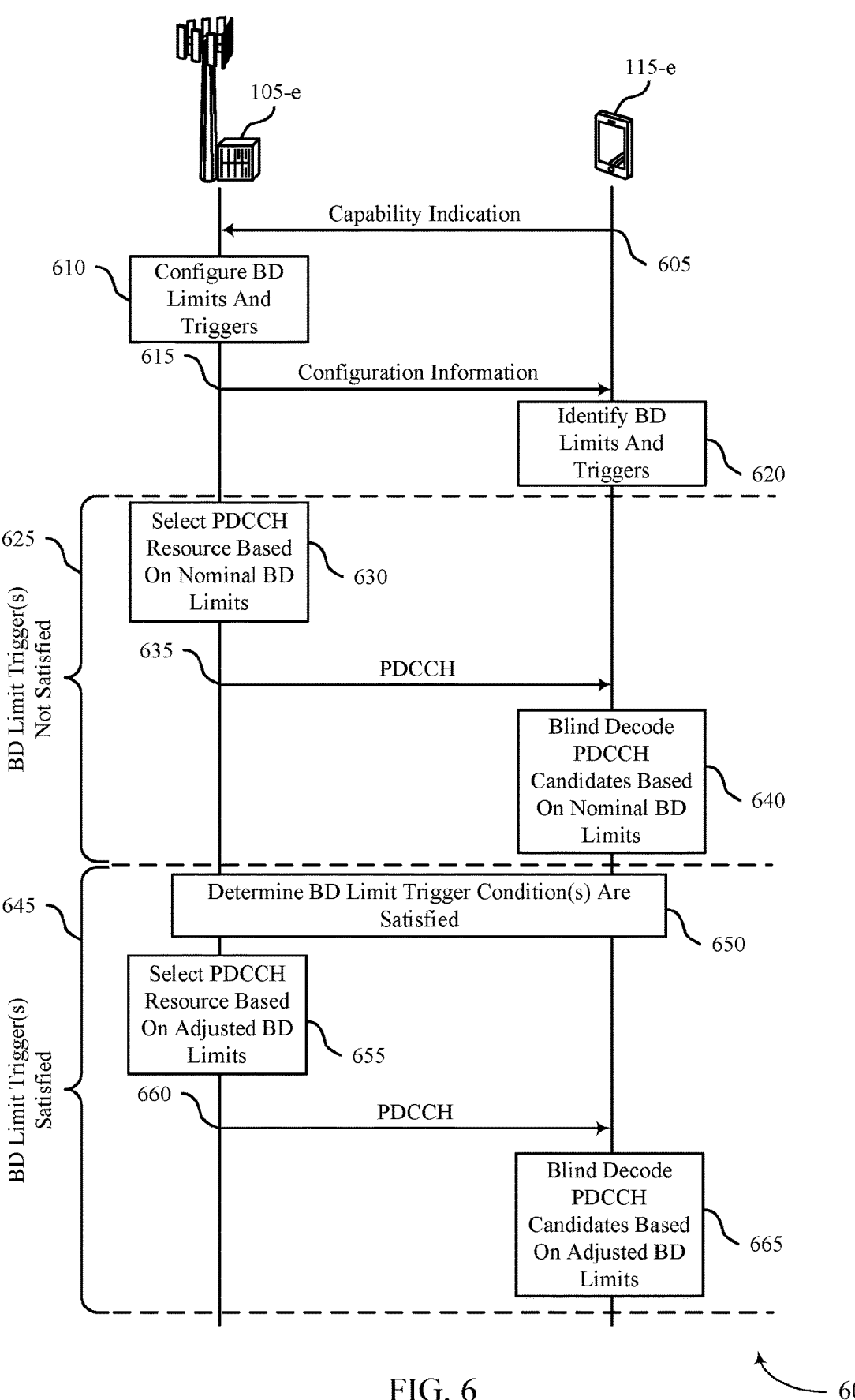
FIG. 6 illustrates an example of a process flow that supports blind decoding limit techniques for wireless communications in accordance with aspects of the present disclosure.

FIG. 6 illustrates an example of a process flow 600 that supports blind decoding limit techniques for wireless communications in accordance with aspects of the present disclosure. In some examples, process flow 600 may implement aspects of wireless communications systems 100 through 500. Process flow 600 may be implemented by a UE 115-*e* and a base station 105-*e*, which may be examples of UEs and base stations as described herein. Alternative examples of the following may be implemented, where some steps are performed in a different order than described or are not performed at all. In some cases, steps may include additional features not mentioned below, or further steps may be added.

At 605, the UE 115-*e* may transmit a UE capability indication to the base station 105-*e*. The UE capability indication may provide, among other things, an indication of an ability of the UE 115-*e* to perform adjustment to blind decoding limits. In some cases, the UE 115-*e* capability indication may be provided on initial access. In other cases, the UE capability indication may be provided in response to a reconfiguration of one or more parameters. The UE capability indication may be transmitted in a MAC-CE, UCI, RRC signaling, or any combinations thereof.

At 610, the base station 105-*e* may configure blind decoding limits and triggers for adjusting the blind decoding limits. In some cases, the blind decoding limits may be configured to provide adjustments to blind decoding limits in the event that one or more trigger limits are satisfied. At 615, the base station 105-*e* may transmit configuration information to the UE 115-*e* that indicates the blind decoding limits and one or more trigger conditions for adjustments to the blind decoding limits. In some cases, the configuration information may be provided by RRC signaling, by one or more DCIs, in one or more MAC-CEs, or any combinations thereof. At 620, the UE 115-*e* may identify the blind decoding limits and triggers for adjustments of the blind decoding limits. The blind decoding limits and conditions for triggering adjustments thereto may be identified in accordance with techniques as discussed herein.

At 625, operations are discussed that are associated with cases in which blind decoding limit trigger(s) are not satisfied. The determination of whether one or more blind decoding limit triggers are satisfied may be performed in accordance with techniques discussed herein. In such cases, the base station 105-*e* may, at 630, select a PDCCH resource based on nominal blind decoding limits. In some cases, the nominal blind decoding limits may be determined based on an aggregation level, number of CCEs, search space for the PDCCH, configured PDCCH candidates per slot, and the like, in accordance with established techniques. At 635, the base station 105-*e* may transmit the PDCCH to the UE 115-*e* using the selected PDCCH resources. At 640, the UE 115-*e* may perform blind decoding based on the nominal number of blind decoding candidates and nominal blind decoding limits.

At 645, operations are discussed that are associated with cases in which blind decoding limit trigger(s) are satisfied. The determination of whether one or more blind decoding limit triggers are satisfied may be performed in accordance with techniques discussed herein. In such cases, the base station 105-*e* and the UE 115-*e* may determine that the blind detection limit trigger condition(s) are satisfied. Such a determination may be based on, for example, a BWP used for PDCCH transmission, a beam used for PDCCH transmission, a periodic pattern, a CORESET or search space of the PDCCH transmission, whether the slot with the PDCCH is configured for piggyback DCI, or any combinations thereof, as discussed herein. At 655, the base station 105-*e* may select a PDCCH resource based on the adjusted blind decoding limits, which may be increased or decreased relative to the nominal blind decoding limits. At 660, the base station 105-*e* may transmit the PDCCH to the UE 115-*e* using the selected PDCCH resources. At 665, the UE 115-*e* may perform blind decoding based on the adjusted number of blind decoding candidates and adjusted blind decoding limits, as discussed herein.

Figure 7:
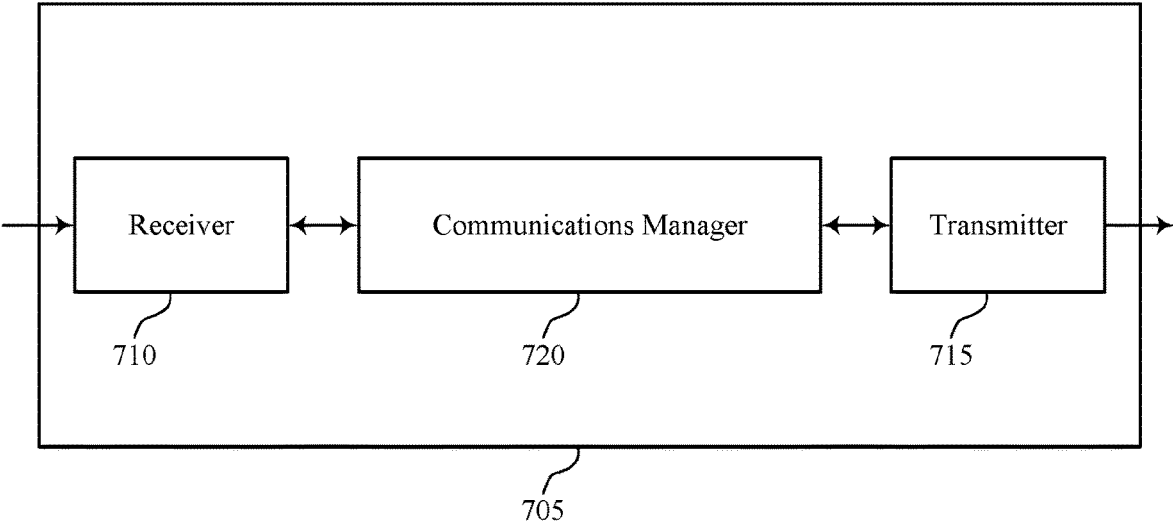
FIGS. 7 and 8 show block diagrams of devices that support blind decoding limit techniques for wireless communications in accordance with aspects of the present disclosure.

FIG. 7 shows a block diagram 700 of a device 705 that supports blind decoding limit techniques for wireless communications in accordance with aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to blind decoding limit techniques for wireless communications). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to blind decoding limit techniques for wireless communications). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of blind decoding limit techniques for wireless communications as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a UE in accordance with examples as disclosed herein. For example, the communications manager 720 may be configured as or otherwise support a means for transmitting, to a base station, an indication that blind decoding limit adjustments are supported at the UE. The communications manager 720 may be configured as or otherwise support a means for receiving, from the base station, a trigger condition for adjustment of a first blind decoding limit from a first number of blind decoding candidates that are to be monitored for a control channel communication from the base station to a second number of blind decoding candidates that are to be monitored from the control channel communication. The communications manager 720 may be configured as or otherwise support a means for detecting that the trigger condition is satisfied at the UE. The communications manager 720 may be configured as or otherwise support a means for adjusting, basing at least in part on the detecting, a number of blind decoding candidates that are to be monitored for the control channel communication from the first number of blind decoding candidates to the second number of blind decoding candidates.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for adjustment of blind decoding limits, which may provide for reduced processing, reduced power consumption, and more efficient utilization of communication resources, for example.

Figure 8:
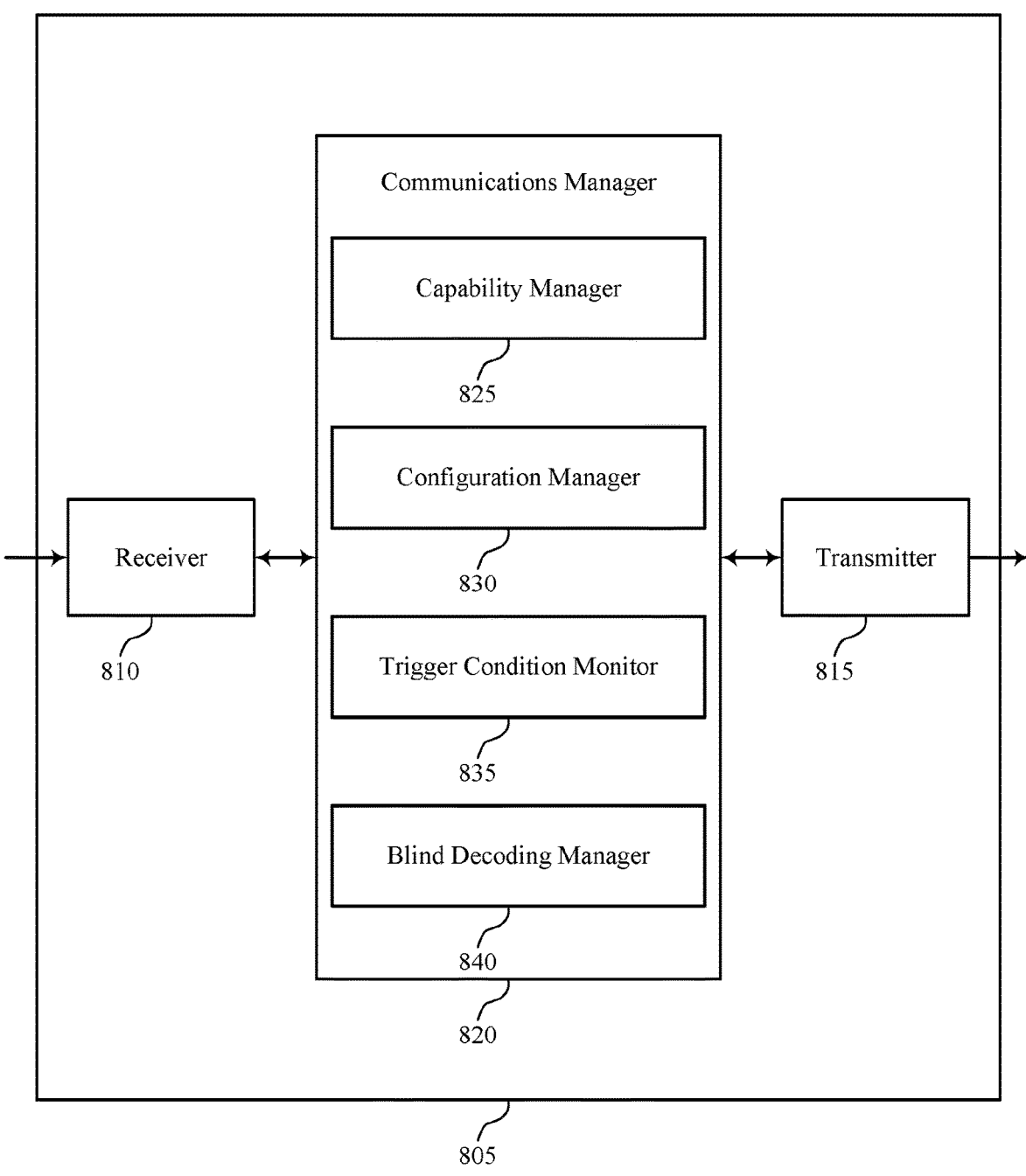

FIG. 8 shows a block diagram 800 of a device 805 that supports blind decoding limit techniques for wireless communications in accordance with aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to blind decoding limit techniques for wireless communications). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to blind decoding limit techniques for wireless communications). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of blind decoding limit techniques for wireless communications as described herein. For example, the communications manager 820 may include a capability manager 825, a configuration manager 830, a trigger condition monitor 835, a blind decoding manager 840, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a UE in accordance with examples as disclosed herein. The capability manager 825 may be configured as or otherwise support a means for transmitting, to a base station, an indication that blind decoding limit adjustments are supported at the UE. The configuration manager 830 may be configured as or otherwise support a means for receiving, from the base station, a trigger condition for adjustment of a first blind decoding limit from a first number of blind decoding candidates that are to be monitored for a control channel communication from the base station to a second number of blind decoding candidates that are to be monitored from the control channel communication. The trigger condition monitor 835 may be configured as or otherwise support a means for detecting that the trigger condition is satisfied at the UE. The blind decoding manager 840 may be configured as or otherwise support a means for adjusting, based on the detecting, a number of blind decoding candidates that are to be monitored for the control channel communication from the first number of blind decoding candidates to the second number of blind decoding candidates.

Figure 9:
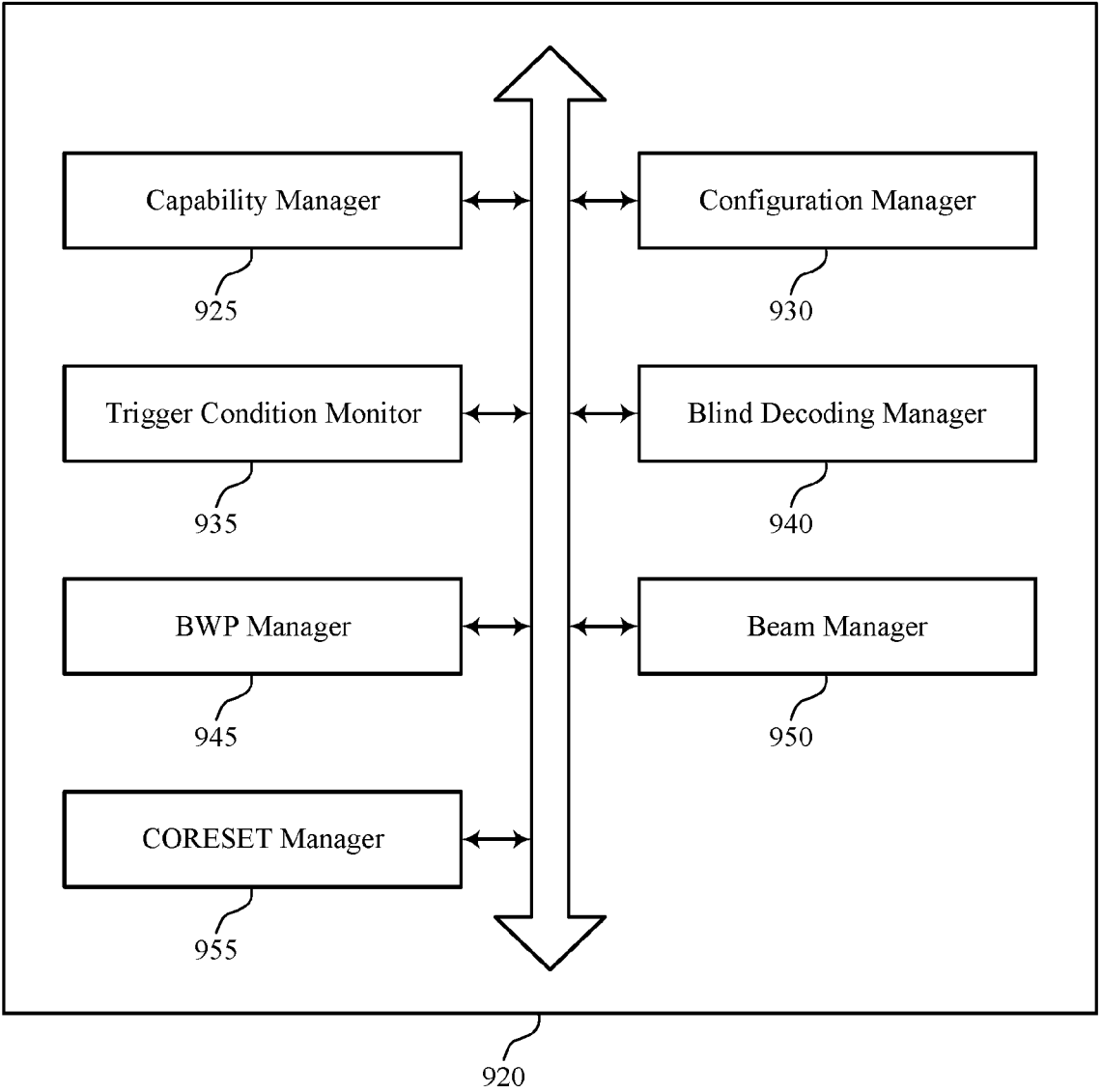
FIG. 9 shows a block diagram of a communications manager that supports blind decoding limit techniques for wireless communications in accordance with aspects of the present disclosure.

FIG. 9 shows a block diagram 900 of a communications manager 920 that supports blind decoding limit techniques for wireless communications in accordance with aspects of the present disclosure. The communications manager 920 may be an example of aspects of a communications manager 720, a communications manager 820, or both, as described herein. The communications manager 920, or various components thereof, may be an example of means for performing various aspects of blind decoding limit techniques for wireless communications as described herein. For example, the communications manager 920 may include a capability manager 925, a configuration manager 930, a trigger condition monitor 935, a blind decoding manager 940, a BWP manager 945, a beam manager 950, a CORESET manager 955, or any combination thereof. Each of these components may communicate, directly or indirectly, with one another (e.g., via one or more buses).

The communications manager 920 may support wireless communication at a UE in accordance with examples as disclosed herein. The capability manager 925 may be configured as or otherwise support a means for transmitting, to a base station, an indication that blind decoding limit adjustments are supported at the UE. The configuration manager 930 may be configured as or otherwise support a means for receiving, from the base station, a trigger condition for adjustment of a first blind decoding limit from a first number of blind decoding candidates that are to be monitored for a control channel communication from the base station to a second number of blind decoding candidates that are to be monitored from the control channel communication. The trigger condition monitor 935 may be configured as or otherwise support a means for detecting that the trigger condition is satisfied at the UE. The blind decoding manager 940 may be configured as or otherwise support a means for adjusting, based on the detecting, a number of blind decoding candidates that are to be monitored for the control channel communication from the first number of blind decoding candidates to the second number of blind decoding candidates.

In some examples, to support receiving, the BWP manager 945 may be configured as or otherwise support a means for receiving a first trigger condition that is associated with a first bandwidth part (BWP), and where the first trigger condition is detected based on an indication that the UE is to use the first BWP for communications with the base station. In some examples, the first trigger condition is configured at the UE in RRC signaling that configures a set of multiple different BWPs for communications between the UE and the base station. In some examples, the first trigger condition is indicated in control channel information associated with a BWP switch to the first BWP, and where the first trigger condition is provided in a same control channel information transmission that indicates the BWP switch to the first BWP, in a different control channel information transmission, or any combinations thereof.

In some examples, to support receiving, the beam manager 950 may be configured as or otherwise support a means for receiving a first trigger condition that is associated with a first transmission configuration indicator (TCI) state, and where the first trigger condition is detected based on an indication that the UE is to use the first TCI state for communications with the base station. In some examples, the first trigger condition is configured at the UE in RRC signaling, is indicated to the UE in a DCI transmission, or any combinations thereof.

In some examples, to support receiving, the trigger condition monitor 935 may be configured as or otherwise support a means for receiving a first trigger condition that is associated with a first portion of a periodic pattern and a second trigger condition that is associated with a second portion of the periodic pattern, and where the first trigger condition or the second trigger condition is detected based on a location of a transmission slot within the periodic pattern. In some examples, the periodic pattern is configured by RRC signaling, and activated or deactivated by DCI.

In some examples, to support receiving, the CORESET manager 955 may be configured as or otherwise support a means for receiving a first trigger condition that is associated with a first type of control resource set (CORESET). In some examples, to support receiving, the CORESET manager 955 may be configured as or otherwise support a means for where the first trigger condition is detected based on an indication that the UE is to monitor the first type of CORESET for control information from the base station. In some examples, to support receiving, the CORESET manager 955 may be configured as or otherwise support a means for where the first type of CORESET is a dynamic CORESET or a UE-requested CORESET.

In some examples, to support receiving, the configuration manager 930 may be configured as or otherwise support a means for receiving a first trigger condition associated with a set of slots in which control information is configured to be provided in resources of a shared channel, and where the first trigger condition is detected based on whether a slot to be monitored is within the set of slots. In some examples, an indication of whether a slot is included in the set of slots is provided in DCI from the base station, in RRC signaling from the base station, or any combinations thereof. In some examples, the indication that blind decoding limit adjustments are supported at the UE is provided in a capability indication that is transmitted to the base station, and where the capability indication includes one or more conditions that can trigger a blind decoding limit adjustment at the UE, an indication of a UE type, or any combinations thereof.

In some examples, to support receiving, the configuration manager 930 may be configured as or otherwise support a means for receiving two or more trigger conditions that are associated with a corresponding two or more parameters associated with communications with the base station. In some examples, to support receiving, the configuration manager 930 may be configured as or otherwise support a means for where the first blind decoding limit is maintained based on a first combination of the two or more trigger conditions and the second blind decoding limit is selected based on a second combination of the two or more trigger conditions. In some examples, the trigger condition for adjustment of a first blind decoding limit is received jointly in a condition configuration, in downlink control information, in a MAC-CE, in RRC signaling, or any combinations thereof.

Figure 10:
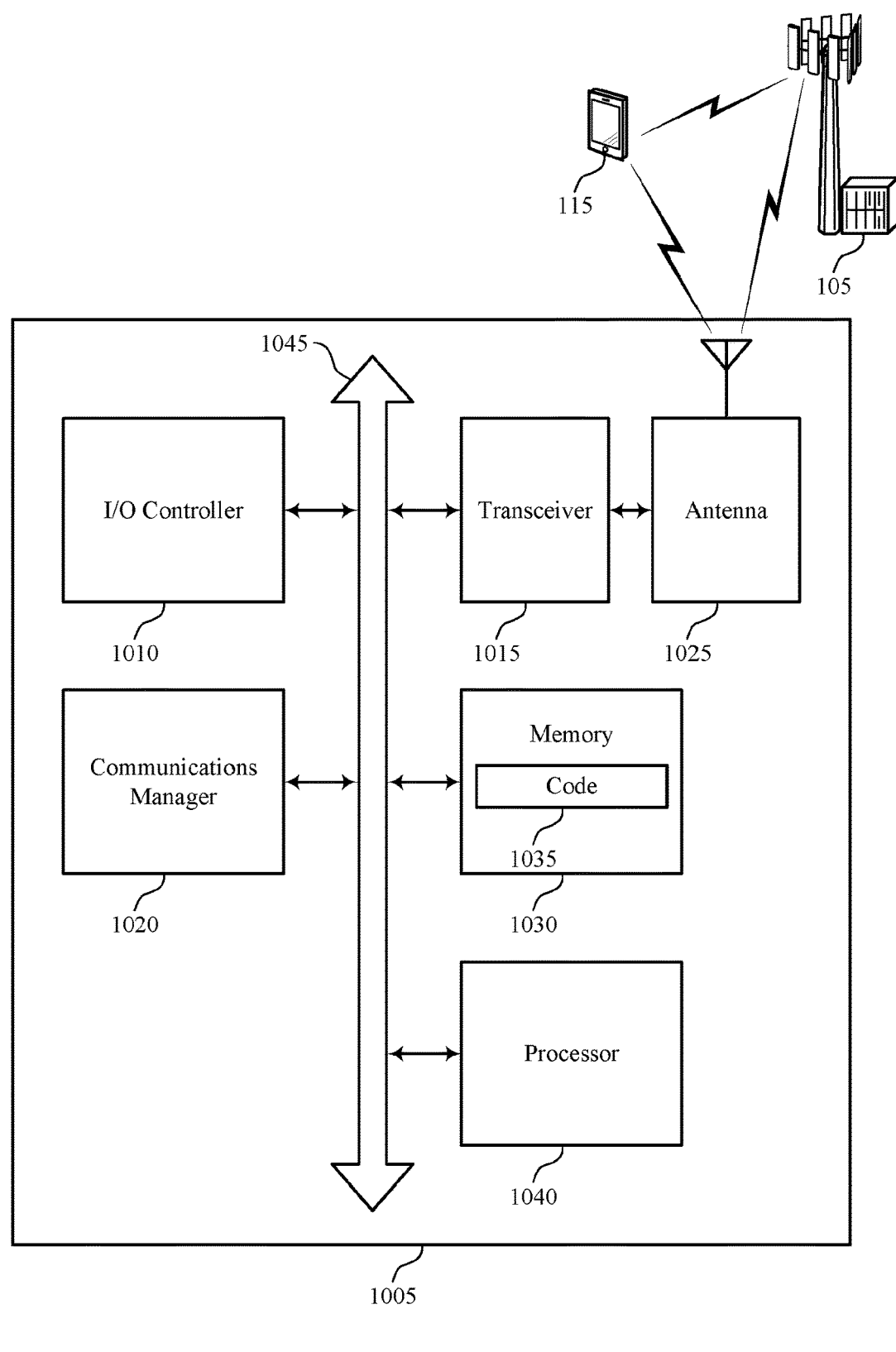
FIG. 10 shows a diagram of a system including a device that supports blind decoding limit techniques for wireless communications in accordance with aspects of the present disclosure.

FIG. 10 shows a diagram of a system 1000 including a device 1005 that supports blind decoding limit techniques for wireless communications in accordance with aspects of the present disclosure. The device 1005 may be an example of or include the components of a device 705, a device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting blind decoding limit techniques for wireless communications). For example, the device 1005 or a component of the device 1005 may include a processor 1040 and memory 1030 coupled to the processor 1040, the processor 1040 and memory 1030 configured to perform various functions described herein.

The communications manager 1020 may support wireless communication at a UE in accordance with examples as disclosed herein. For example, the communications manager 1020 may be configured as or otherwise support a means for transmitting, to a base station, an indication that blind decoding limit adjustments are supported at the UE. The communications manager 1020 may be configured as or otherwise support a means for receiving, from the base station, a trigger condition for adjustment of a first blind decoding limit from a first number of blind decoding candidates that are to be monitored for a control channel communication from the base station to a second number of blind decoding candidates that are to be monitored from the control channel communication. The communications manager 1020 may be configured as or otherwise support a means for detecting that the trigger condition is satisfied at the UE. The communications manager 1020 may be configured as or otherwise support a means for adjusting, basing at least in part on the detecting, a number of blind decoding candidates that are to be monitored for the control channel communication from the first number of blind decoding candidates to the second number of blind decoding candidates.

By including or configuring the communications manager 1020 in accordance with examples as described herein, the device 1005 may support techniques for reducing a number of blind decodes performed at the device 1005, which may provide, for example, improved communication reliability, reduced latency, improved user experience related to reduced processing, reduced power consumption, more efficient utilization of communication resources, longer battery life, improved utilization of processing capability, or combinations thereof.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of blind decoding limit techniques for wireless communications as described herein, or the processor 1040 and the memory 1030 may be otherwise configured to perform or support such operations.

Figure 11:
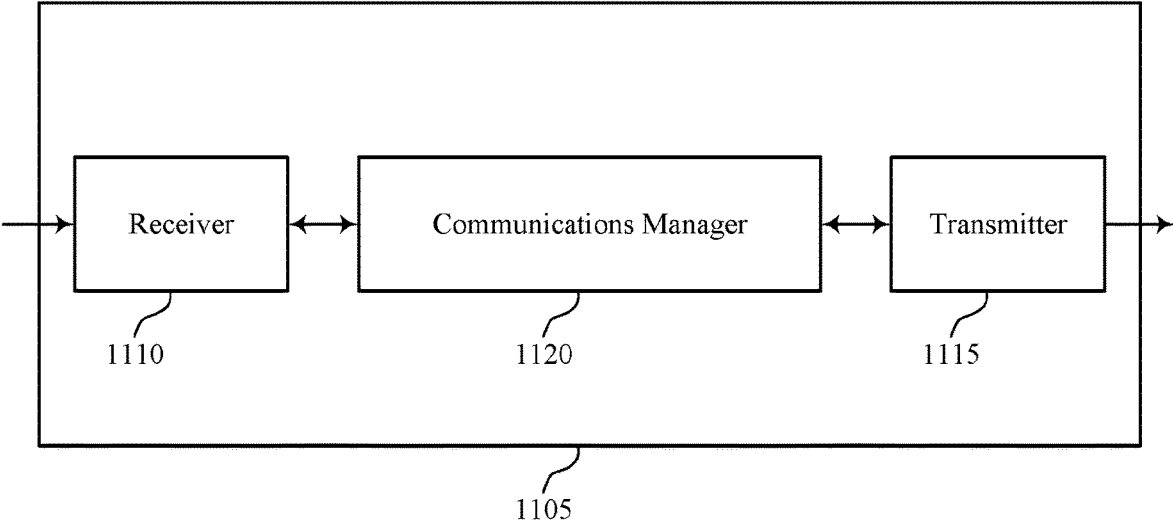
FIGS. 11 and 12 show block diagrams of devices that support blind decoding limit techniques for wireless communications in accordance with aspects of the present disclosure.

FIG. 11 shows a block diagram 1100 of a device 1105 that supports blind decoding limit techniques for wireless communications in accordance with aspects of the present disclosure. The device 1105 may be an example of aspects of a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to blind decoding limit techniques for wireless communications). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to blind decoding limit techniques for wireless communications). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of blind decoding limit techniques for wireless communications as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1120, the receiver 1110, the transmitter 1115, or various combinations or components thereof may be implemented in code (e.g., as communications management software or firmware) executed by a processor.

If implemented in code executed by a processor, the functions of the communications manager 1120, the receiver 1110, the transmitter 1115, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a base station in accordance with examples as disclosed herein. For example, the communications manager 1120 may be configured as or otherwise support a means for receiving, from a UE, an indication that blind decoding limit adjustments are supported at the UE. The communications manager 1120 may be configured as or otherwise support a means for determining one or more trigger conditions for adjustment of at least a first blind decoding limit that indicates a number of blind decoding candidates that are to be monitored at the UE for a control channel communication from the base station. The communications manager 1120 may be configured as or otherwise support a means for transmitting, to the UE, the one or more trigger conditions, including at least a first trigger condition for adjustment of the first blind decoding limit from a first number of blind decoding candidates to a second number of blind decoding candidates. The communications manager 1120 may be configured as or otherwise support a means for selecting a control channel resource for the control channel communication to the UE from the first number of blind decoding candidates or from the second number of blind decoding candidates based on whether the first trigger condition is satisfied.

By including or configuring the communications manager 1120 in accordance with examples as described herein, the device 1105 (e.g., a processor controlling or otherwise coupled to the receiver 1110, the transmitter 1115, the communications manager 1120, or a combination thereof) may support techniques for adjustments to blind decoding limits, as discussed herein, which may provide reduced processing, reduced power consumption, and more efficient utilization of communication resources.

Figure 12:
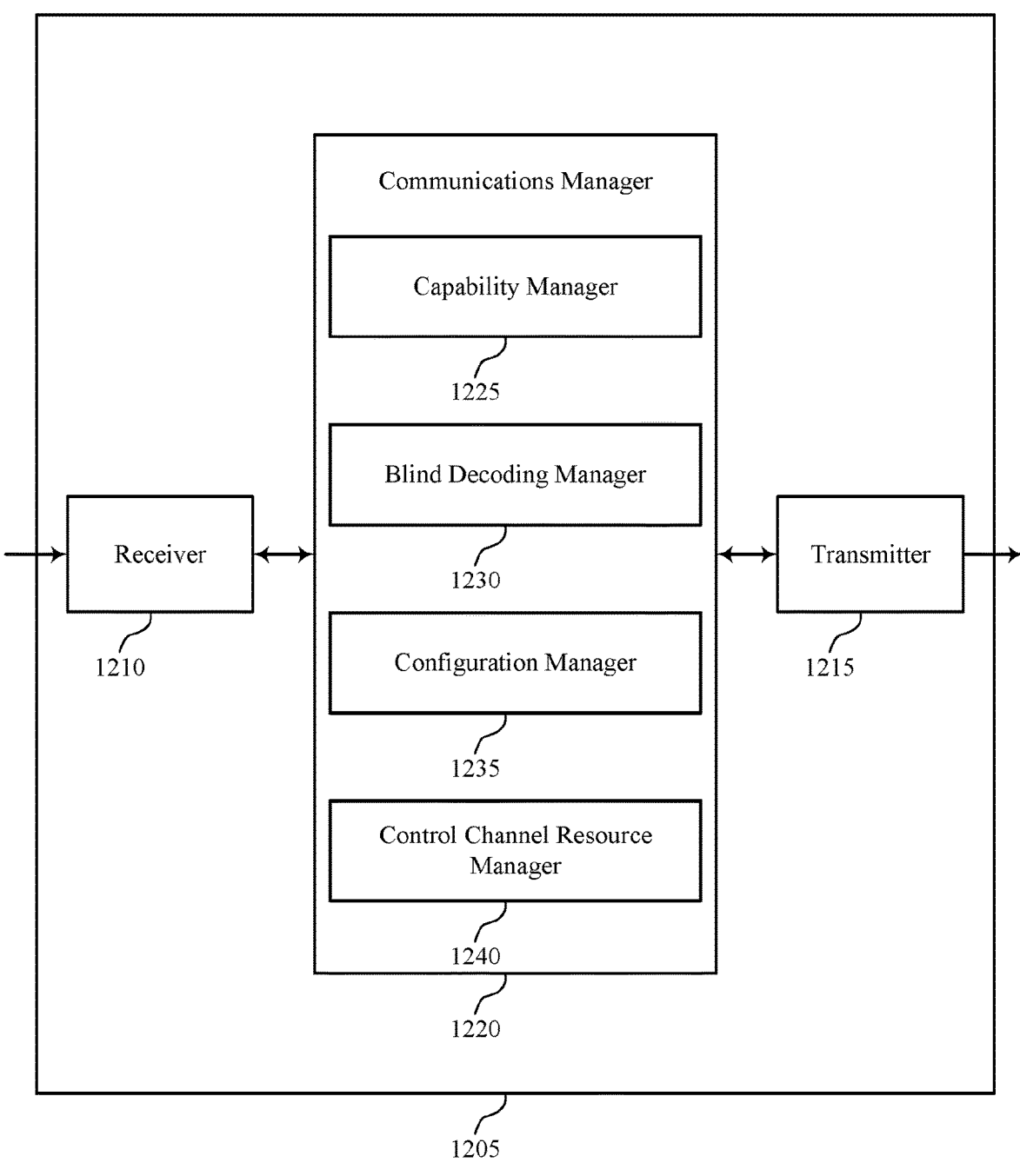

FIG. 12 shows a block diagram 1200 of a device 1205 that supports blind decoding limit techniques for wireless communications in accordance with aspects of the present disclosure. The device 1205 may be an example of aspects of a device 1105 or a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to blind decoding limit techniques for wireless communications). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to blind decoding limit techniques for wireless communications). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of blind decoding limit techniques for wireless communications as described herein. For example, the communications manager 1220 may include a capability manager 1225, a blind decoding manager 1230, a configuration manager 1235, a control channel resource manager 1240, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communication at a base station in accordance with examples as disclosed herein. The capability manager 1225 may be configured as or otherwise support a means for receiving, from a UE, an indication that blind decoding limit adjustments are supported at the UE. The blind decoding manager 1230 may be configured as or otherwise support a means for determining one or more trigger conditions for adjustment of at least a first blind decoding limit that indicates a number of blind decoding candidates that are to be monitored at the UE for a control channel communication from the base station. The configuration manager 1235 may be configured as or otherwise support a means for transmitting, to the UE, the one or more trigger conditions, including at least a first trigger condition for adjustment of the first blind decoding limit from a first number of blind decoding candidates to a second number of blind decoding candidates. The control channel resource manager 1240 may be configured as or otherwise support a means for selecting a control channel resource for the control channel communication to the UE from the first number of blind decoding candidates or from the second number of blind decoding candidates based on whether the first trigger condition is satisfied.

Figure 13:
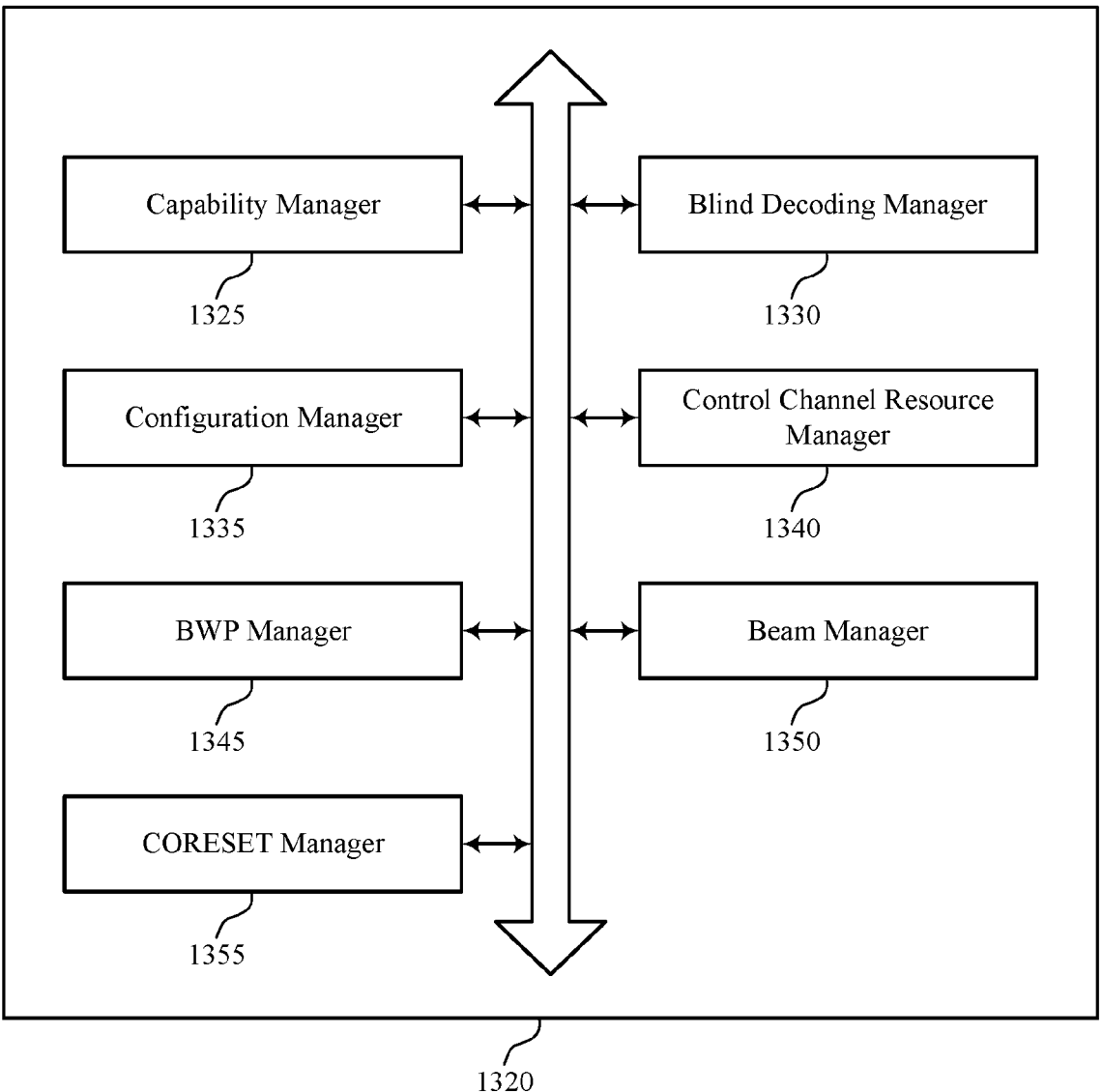
FIG. 13 shows a block diagram of a communications manager that supports blind decoding limit techniques for wireless communications in accordance with aspects of the present disclosure.

FIG. 13 shows a block diagram 1300 of a communications manager 1320 that supports blind decoding limit techniques for wireless communications in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of blind decoding limit techniques for wireless communications as described herein. For example, the communications manager 1320 may include a capability manager 1325, a blind decoding manager 1330, a configuration manager 1335, a control channel resource manager 1340, a BWP manager 1345, a beam manager 1350, a CORESET manager 1355, or any combination thereof. Each of these components may communicate, directly or indirectly, with one another (e.g., via one or more buses).

The communications manager 1320 may support wireless communication at a base station in accordance with examples as disclosed herein. The capability manager 1325 may be configured as or otherwise support a means for receiving, from a UE, an indication that blind decoding limit adjustments are supported at the UE. The blind decoding manager 1330 may be configured as or otherwise support a means for determining one or more trigger conditions for adjustment of at least a first blind decoding limit that indicates a number of blind decoding candidates that are to be monitored at the UE for a control channel communication from the base station. The configuration manager 1335 may be configured as or otherwise support a means for transmitting, to the UE, the one or more trigger conditions, including at least a first trigger condition for adjustment of the first blind decoding limit from a first number of blind decoding candidates to a second number of blind decoding candidates. The control channel resource manager 1340 may be configured as or otherwise support a means for selecting a control channel resource for the control channel communication to the UE from the first number of blind decoding candidates or from the second number of blind decoding candidates based on whether the first trigger condition is satisfied.

In some examples, the first trigger condition is associated with a first bandwidth part (BWP), and where the first trigger condition is satisfied based on an indication that the UE is to use the first BWP for communications with the base station. In some examples, the first trigger condition is indicated in a control channel information transmission associated a BWP switch to the first BWP, and where the first trigger condition is provided in a same control channel information transmission that indicates the BWP switch to the first BWP, in a different control channel information transmission, or any combinations thereof. In some examples, the first trigger condition is associated with a first transmission configuration indicator (TCI) state, and where the first trigger condition is satisfied based on an indication that the UE is to use the first TCI state for communications with the base station. In some examples, the first trigger condition is configured at the UE in RRC signaling, is indicated to the UE in a DCI transmission, or any combinations thereof. In some examples, the first trigger condition is associated with a first portion of a periodic pattern and a second trigger condition is associated with a second portion of the periodic pattern, and where the first trigger condition or the second trigger condition is satisfied based on a location of a transmission slot within the periodic pattern.

In some examples, the first trigger condition is associated with a first type of control resource set (CORESET), where the first trigger condition is satisfied based on an indication that the UE is to monitor the first type of CORESET for control information from the base station. In some examples, where the first type of CORESET is a dynamic CORESET or a UE-requested CORESET. In some examples, the first trigger condition is associated with a set of slots in which control information is configured to be provided in resources of a shared channel, and where the first trigger condition is satisfied based on whether a slot to be monitored is within the set of slots. In some examples, the indication that blind decoding limit adjustments are supported at the UE is provided in a capability indication that is received from the UE, and where the capability indication includes one or more parameters that can trigger a blind decoding limit adjustment at the UE, an indication of a UE type, or any combinations thereof. In some examples, two or more trigger conditions are associated with a corresponding two or more parameters associated with communications with the base station. In some examples, where the first blind decoding limit is maintained based on a first combination of the two or more trigger conditions and the second blind decoding limit is selected based on a second combination of the two or more trigger conditions. In some examples, the trigger condition for adjustment of a first blind decoding limit is received jointly in a condition configuration, in downlink control information, in a MAC-CE, in RRC signaling, or any combinations thereof.

Figure 14:
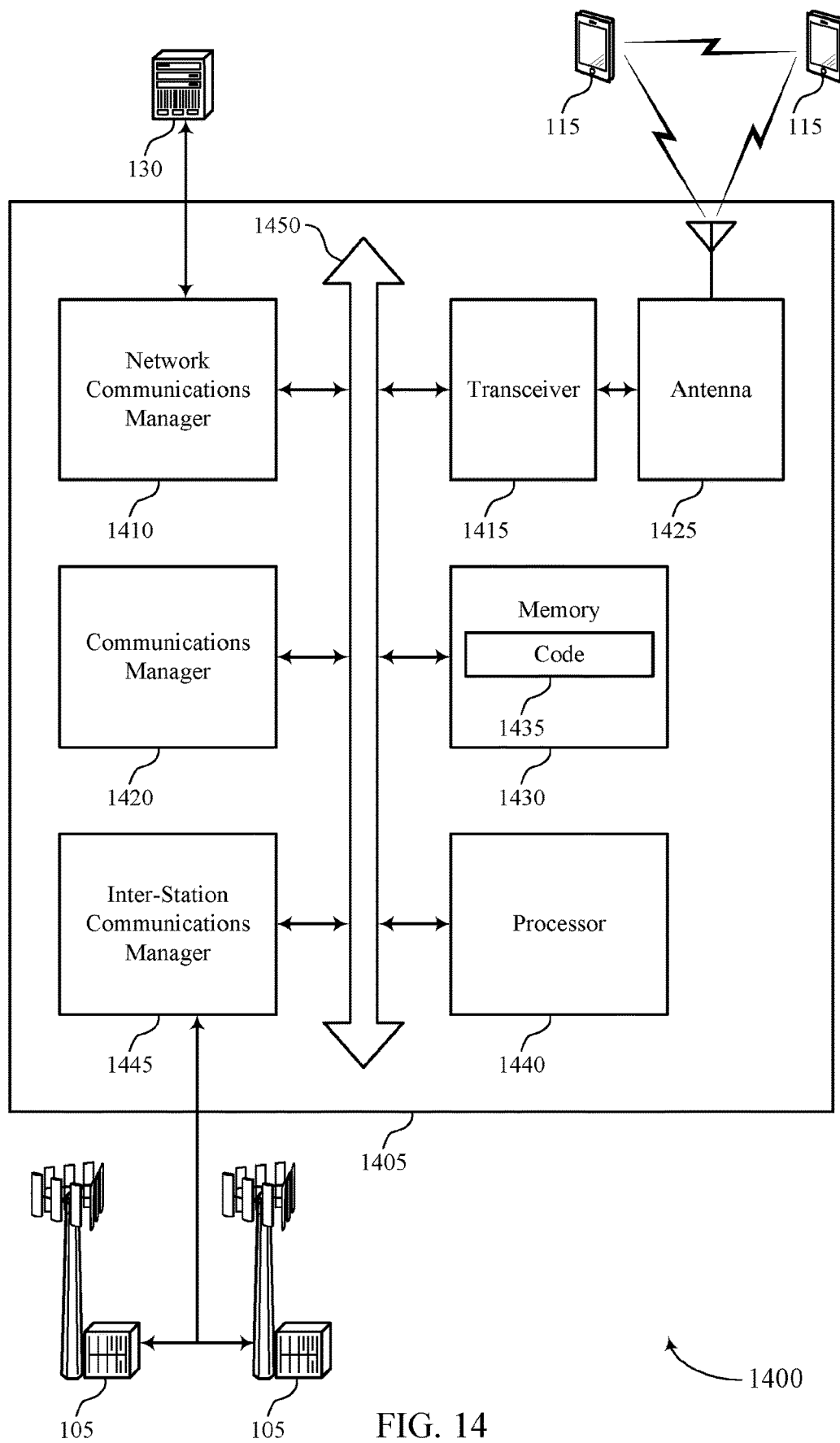
FIG. 14 shows a diagram of a system including a device that supports blind decoding limit techniques for wireless communications in accordance with aspects of the present disclosure.

FIG. 14 shows a diagram of a system 1400 including a device 1405 that supports blind decoding limit techniques for wireless communications in accordance with aspects of the present disclosure. The device 1405 may be an example of or include the components of a device 1105, a device 1205, or a base station 105 as described herein. The device 1405 may communicate wirelessly with one or more base stations 105, UEs 115, or any combination thereof. The device 1405 may include components for bi-directional voice and data communications including components for transmitting and receiving communications, such as a communications manager 1420, a network communications manager 1410, a transceiver 1415, an antenna 1425, a memory 1430, code 1435, a processor 1440, and an inter-station communications manager 1445. These components may be in electronic communication or otherwise coupled (e.g., operatively, communicatively, functionally, electronically, electrically) via one or more buses (e.g., a bus 1450).

The network communications manager 1410 may manage communications with a core network 130 (e.g., via one or more wired backhaul links). For example, the network communications manager 1410 may manage the transfer of data communications for client devices, such as one or more UEs 115.

In some cases, the device 1405 may include a single antenna 1425. However, in some other cases the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include RAM and ROM. The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory.

In some cases, the code 1435 may not be directly executable by the processor 1440 but may cause a computer (e.g., when compiled and executed) to perform functions described herein. In some cases, the memory 1430 may contain, among other things, a BIOS which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting blind decoding limit techniques for wireless communications). For example, the device 1405 or a component of the device 1405 may include a processor 1440 and memory 1430 coupled to the processor 1440, the processor 1440 and memory 1430 configured to perform various functions described herein.

The inter-station communications manager 1445 may manage communications with other base stations 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communications network technology to provide communication between base stations 105.

The communications manager 1420 may support wireless communication at a base station in accordance with examples as disclosed herein. For example, the communications manager 1420 may be configured as or otherwise support a means for receiving, from a UE, an indication that blind decoding limit adjustments are supported at the UE. The communications manager 1420 may be configured as or otherwise support a means for determining one or more trigger conditions for adjustment of at least a first blind decoding limit that indicates a number of blind decoding candidates that are to be monitored at the UE for a control channel communication from the base station. The communications manager 1420 may be configured as or otherwise support a means for transmitting, to the UE, the one or more trigger conditions, including at least a first trigger condition for adjustment of the first blind decoding limit from a first number of blind decoding candidates to a second number of blind decoding candidates. The communications manager 1420 may be configured as or otherwise support a means for selecting a control channel resource for the control channel communication to the UE from the first number of blind decoding candidates or from the second number of blind decoding candidates based on whether the first trigger condition is satisfied.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of blind decoding limit techniques for wireless communications as described herein, or the processor 1440 and the memory 1430 may be otherwise configured to perform or support such operations.

FIG. 15 shows a flowchart illustrating a method 1500 that supports blind decoding limit techniques for wireless communications in accordance with aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1505, the method may include transmitting, to a base station, an indication that blind decoding limit adjustments are supported at the UE. The operations of 1505 may be performed in accordance with examples as disclosed herein. In some examples, aspects of the operations of 1505 may be performed by a capability manager 925 as described with reference to FIG. 9.

At 1510, the method may include receiving, from the base station, a trigger condition for adjustment of a first blind decoding limit from a first number of blind decoding candidates that are to be monitored for a control channel communication from the base station to a second number of blind decoding candidates that are to be monitored from the control channel communication. The operations of 1510 may be performed in accordance with examples as disclosed herein. In some examples, aspects of the operations of 1510 may be performed by a configuration manager 930 as described with reference to FIG. 9.

At 1515, the method may include detecting that the trigger condition is satisfied at the UE. The operations of 1515 may be performed in accordance with examples as disclosed herein. In some examples, aspects of the operations of 1515 may be performed by a trigger condition monitor 935 as described with reference to FIG. 9.

At 1520, the method may include adjusting, based on the detecting, a number of blind decoding candidates that are to be monitored for the control channel communication from the first number of blind decoding candidates to the second number of blind decoding candidates. The operations of 1520 may be performed in accordance with examples as disclosed herein. In some examples, aspects of the operations of 1520 may be performed by a blind decoding manager 940 as described with reference to FIG. 9.

FIG. 16 shows a flowchart illustrating a method 1600 that supports blind decoding limit techniques for wireless communications in accordance with aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1605, the method may include transmitting, to a base station, an indication that blind decoding limit adjustments are supported at the UE. The operations of 1605 may be performed in accordance with examples as disclosed herein. In some examples, aspects of the operations of 1605 may be performed by a capability manager 925 as described with reference to FIG. 9.

At 1610, the method may include receiving, from the base station, a trigger condition for adjustment of a first blind decoding limit from a first number of blind decoding candidates that are to be monitored for a control channel communication from the base station to a second number of blind decoding candidates that are to be monitored from the control channel communication. The operations of 1610 may be performed in accordance with examples as disclosed herein. In some examples, aspects of the operations of 1610 may be performed by a configuration manager 930 as described with reference to FIG. 9.

At 1615, the method may include receiving a first trigger condition that is associated with a first bandwidth part (BWP). The operations of 1615 may be performed in accordance with examples as disclosed herein. In some examples, aspects of the operations of 1615 may be performed by a BWP manager 945 as described with reference to FIG. 9.

At 1620, the method may include detecting that the trigger condition is satisfied at the UE based on an indication that the UE is to use the first BWP for communications with the base station. The operations of 1620 may be performed in accordance with examples as disclosed herein. In some examples, aspects of the operations of 1620 may be performed by a trigger condition monitor 935 as described with reference to FIG. 9.

At 1625, the method may include adjusting, based on the detecting, a number of blind decoding candidates that are to be monitored for the control channel communication from the first number of blind decoding candidates to the second number of blind decoding candidates. The operations of 1625 may be performed in accordance with examples as disclosed herein. In some examples, aspects of the operations of 1625 may be performed by a blind decoding manager 940 as described with reference to FIG. 9.

FIG. 17 shows a flowchart illustrating a method 1700 that supports blind decoding limit techniques for wireless communications in accordance with aspects of the present disclosure. The operations of the method 1700 may be implemented by a UE or its components as described herein. For example, the operations of the method 1700 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1705, the method may include transmitting, to a base station, an indication that blind decoding limit adjustments are supported at the UE. The operations of 1705 may be performed in accordance with examples as disclosed herein. In some examples, aspects of the operations of 1705 may be performed by a capability manager 925 as described with reference to FIG. 9.

At 1710, the method may include receiving, from the base station, a trigger condition for adjustment of a first blind decoding limit from a first number of blind decoding candidates that are to be monitored for a control channel communication from the base station to a second number of blind decoding candidates that are to be monitored from the control channel communication. The operations of 1710 may be performed in accordance with examples as disclosed herein. In some examples, aspects of the operations of 1710 may be performed by a configuration manager 930 as described with reference to FIG. 9.

At 1715, the method may include receiving a first trigger condition that is associated with a first transmission configuration indicator (TCI) state. The operations of 1715 may be performed in accordance with examples as disclosed herein. In some examples, aspects of the operations of 1715 may be performed by a beam manager 950 as described with reference to FIG. 9.

At 1720, the method may include detecting that the trigger condition is satisfied at the UE based on an indication that the UE is to use the first TCI state for communications with the base station. The operations of 1720 may be performed in accordance with examples as disclosed herein. In some examples, aspects of the operations of 1720 may be performed by a trigger condition monitor 935 as described with reference to FIG. 9.

At 1725, the method may include adjusting, based on the detecting, a number of blind decoding candidates that are to be monitored for the control channel communication from the first number of blind decoding candidates to the second number of blind decoding candidates. The operations of 1725 may be performed in accordance with examples as disclosed herein. In some examples, aspects of the operations of 1725 may be performed by a blind decoding manager 940 as described with reference to FIG. 9.

FIG. 18 shows a flowchart illustrating a method 1800 that supports blind decoding limit techniques for wireless communications in accordance with aspects of the present disclosure. The operations of the method 1800 may be implemented by a UE or its components as described herein. For example, the operations of the method 1800 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1805, the method may include transmitting, to a base station, an indication that blind decoding limit adjustments are supported at the UE. The operations of 1805 may be performed in accordance with examples as disclosed herein. In some examples, aspects of the operations of 1805 may be performed by a capability manager 925 as described with reference to FIG. 9.

At 1810, the method may include receiving, from the base station, a trigger condition for adjustment of a first blind decoding limit from a first number of blind decoding candidates that are to be monitored for a control channel communication from the base station to a second number of blind decoding candidates that are to be monitored from the control channel communication. The operations of 1810 may be performed in accordance with examples as disclosed herein. In some examples, aspects of the operations of 1810 may be performed by a configuration manager 930 as described with reference to FIG. 9.

At 1815, the method may include receiving a first trigger condition that is associated with a first portion of a periodic pattern and a second trigger condition that is associated with a second portion of the periodic pattern. The operations of 1815 may be performed in accordance with examples as disclosed herein. In some examples, aspects of the operations of 1815 may be performed by a trigger condition monitor 935 as described with reference to FIG. 9.

At 1820, the method may include detecting that the trigger condition is satisfied at the UE based on a location of a transmission slot within the periodic pattern. The operations of 1820 may be performed in accordance with examples as disclosed herein. In some examples, aspects of the operations of 1820 may be performed by a trigger condition monitor 935 as described with reference to FIG. 9.

At 1825, the method may include adjusting, based on the detecting, a number of blind decoding candidates that are to be monitored for the control channel communication from the first number of blind decoding candidates to the second number of blind decoding candidates. The operations of 1825 may be performed in accordance with examples as disclosed herein. In some examples, aspects of the operations of 1825 may be performed by a blind decoding manager 940 as described with reference to FIG. 9.

FIG. 19 shows a flowchart illustrating a method 1900 that supports blind decoding limit techniques for wireless communications in accordance with aspects of the present disclosure. The operations of the method 1900 may be implemented by a UE or its components as described herein. For example, the operations of the method 1900 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1905, the method may include transmitting, to a base station, an indication that blind decoding limit adjustments are supported at the UE. The operations of 1905 may be performed in accordance with examples as disclosed herein. In some examples, aspects of the operations of 1905 may be performed by a capability manager 925 as described with reference to FIG. 9.

At 1910, the method may include receiving, from the base station, a trigger condition for adjustment of a first blind decoding limit from a first number of blind decoding candidates that are to be monitored for a control channel communication from the base station to a second number of blind decoding candidates that are to be monitored from the control channel communication. The operations of 1910 may be performed in accordance with examples as disclosed herein. In some examples, aspects of the operations of 1910 may be performed by a configuration manager 930 as described with reference to FIG. 9.

At 1915, the method may include receiving a first trigger condition that is associated with a first type of control resource set (CORESET). The operations of 1915 may be performed in accordance with examples as disclosed herein. In some examples, aspects of the operations of 1915 may be performed by a CORESET manager 955 as described with reference to FIG. 9.

At 1920, the method may include detecting that the trigger condition is satisfied at the UE based on an indication that the UE is to monitor the first type of CORESET for control information from the base station. The operations of 1920 may be performed in accordance with examples as disclosed herein. In some examples, aspects of the operations of 1920 may be performed by a trigger condition monitor 935 as described with reference to FIG. 9. In some cases, the first type of CORESET is a dynamic CORESET or a UE-requested CORESET.

At 1925, the method may include adjusting, based on the detecting, a number of blind decoding candidates that are to be monitored for the control channel communication from the first number of blind decoding candidates to the second number of blind decoding candidates. The operations of 1925 may be performed in accordance with examples as disclosed herein. In some examples, aspects of the operations of 1925 may be performed by a blind decoding manager 940 as described with reference to FIG. 9.

FIG. 20 shows a flowchart illustrating a method 2000 that supports blind decoding limit techniques for wireless communications in accordance with aspects of the present disclosure. The operations of the method 2000 may be implemented by a UE or its components as described herein. For example, the operations of the method 2000 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 2005, the method may include transmitting, to a base station, an indication that blind decoding limit adjustments are supported at the UE. The operations of 2005 may be performed in accordance with examples as disclosed herein. In some examples, aspects of the operations of 2005 may be performed by a capability manager 925 as described with reference to FIG. 9.

At 2010, the method may include receiving, from the base station, a trigger condition for adjustment of a first blind decoding limit from a first number of blind decoding candidates that are to be monitored for a control channel communication from the base station to a second number of blind decoding candidates that are to be monitored from the control channel communication. The operations of 2010 may be performed in accordance with examples as disclosed herein. In some examples, aspects of the operations of 2010 may be performed by a configuration manager 930 as described with reference to FIG. 9.

At 2015, the method may include receiving a first trigger condition associated with a set of slots in which control information is configured to be provided in resources of a shared channel. The operations of 2015 may be performed in accordance with examples as disclosed herein. In some examples, aspects of the operations of 2015 may be performed by a configuration manager 930 as described with reference to FIG. 9.

At 2020, the method may include detecting that the trigger condition is satisfied at the UE based on whether a slot to be monitored is within the set of slots. The operations of 2020 may be performed in accordance with examples as disclosed herein. In some examples, aspects of the operations of 2020 may be performed by a trigger condition monitor 935 as described with reference to FIG. 9.

At 2025, the method may include adjusting, based on the detecting, a number of blind decoding candidates that are to be monitored for the control channel communication from the first number of blind decoding candidates to the second number of blind decoding candidates. The operations of 2025 may be performed in accordance with examples as disclosed herein. In some examples, aspects of the operations of 2025 may be performed by a blind decoding manager 940 as described with reference to FIG. 9.

FIG. 21 shows a flowchart illustrating a method 2100 that supports blind decoding limit techniques for wireless communications in accordance with aspects of the present disclosure. The operations of the method 2100 may be implemented by a base station or its components as described herein. For example, the operations of the method 2100 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 2105, the method may include receiving, from a UE, an indication that blind decoding limit adjustments are supported at the UE. The operations of 2105 may be performed in accordance with examples as disclosed herein. In some examples, aspects of the operations of 2105 may be performed by a capability manager 1325 as described with reference to FIG. 13.

At 2110, the method may include determining one or more trigger conditions for adjustment of at least a first blind decoding limit that indicates a number of blind decoding candidates that are to be monitored at the UE for a control channel communication from the base station. The operations of 2110 may be performed in accordance with examples as disclosed herein. In some examples, aspects of the operations of 2110 may be performed by a blind decoding manager 1330 as described with reference to FIG. 13.

At 2115, the method may include transmitting, to the UE, the one or more trigger conditions, including at least a first trigger condition for adjustment of the first blind decoding limit from a first number of blind decoding candidates to a second number of blind decoding candidates. The operations of 2115 may be performed in accordance with examples as disclosed herein. In some examples, aspects of the operations of 2115 may be performed by a configuration manager 1335 as described with reference to FIG. 13.

At 2120, the method may include selecting a control channel resource for the control channel communication to the UE from the first number of blind decoding candidates or from the second number of blind decoding candidates based on whether the first trigger condition is satisfied. The operations of 2120 may be performed in accordance with examples as disclosed herein. In some examples, aspects of the operations of 2120 may be performed by a control channel resource manager 1340 as described with reference to FIG. 13.

The following provides an overview of aspects of the present disclosure:

Aspect 1: A method for wireless communication at a UE, comprising: transmitting, to a base station, an indication that blind decoding limit adjustments are supported at the UE; receiving, from the base station, a trigger condition for adjustment of a first blind decoding limit from a first number of blind decoding candidates that are to be monitored for a control channel communication from the base station to a second number of blind decoding candidates that are to be monitored from the control channel communication; detecting that the trigger condition is satisfied at the UE; and adjusting, based at least in part on the detecting, a number of blind decoding candidates that are to be monitored for the control channel communication from the first number of blind decoding candidates to the second number of blind decoding candidates.

Aspect 2: The method of aspect 1, wherein the receiving comprises: receiving a first trigger condition that is associated with a first bandwidth part (BWP), and wherein the first trigger condition is detected based at least in part on an indication that the UE is to use the first BWP for communications with the base station.

Aspect 3: The method of aspect 2, wherein the first trigger condition is configured at the UE in RRC signaling that configures a plurality of different BWPs for communications between the UE and the base station.

Aspect 4: The method of any of aspects 2 through 3, wherein the first trigger condition is indicated in control channel information associated with a BWP switch to the first BWP, and wherein the first trigger condition is provided in a same control channel information transmission that indicates the BWP switch to the first BWP, in a different control channel information transmission, or any combinations thereof.

Aspect 5: The method of any of aspects 1 through 4, wherein the receiving further comprises: receiving a first trigger condition that is associated with a first transmission configuration indicator (TCI) state, and wherein the first trigger condition is detected based at least in part on an indication that the UE is to use the first TCI state for communications with the base station.

Aspect 6: The method of aspect 5, wherein the first trigger condition is configured at the UE in RRC signaling, is indicated to the UE in a DCI transmission, or any combinations thereof.

Aspect 7: The method of any of aspects 1 through 6, wherein the receiving further comprises: receiving a first trigger condition that is associated with a first portion of a periodic pattern and a second trigger condition that is associated with a second portion of the periodic pattern, and wherein the first trigger condition or the second trigger condition is detected based at least in part on a location of a transmission slot within the periodic pattern.

Aspect 8: The method of aspect 7, wherein the periodic pattern is configured by RRC signaling, and activated or deactivated by DCI.

Aspect 9: The method of any of aspects 1 through 8, wherein the receiving further comprises: receiving a first trigger condition that is associated with a first type of control resource set (CORESET), wherein the first trigger condition is detected based at least in part on an indication that the UE is to monitor the first type of CORESET for control information from the base station, and wherein the first type of CORESET is a dynamic CORESET or a UE-requested CORESET.

Aspect 10: The method of any of aspects 1 through 9, wherein the receiving further comprises: receiving a first trigger condition associated with a set of slots in which control information is configured to be provided in resources of a shared channel, and wherein the first trigger condition is detected based at least in part on whether a slot to be monitored is within the set of slots.

Aspect 11: The method of aspect 10, wherein an indication of whether a slot is included in the set of slots is provided in DCI from the base station, in RRC signaling from the base station, or any combinations thereof.

Aspect 12: The method of any of aspects 1 through 11, wherein the indication that blind decoding limit adjustments are supported at the UE is provided in a capability indication that is transmitted to the base station, and wherein the capability indication includes one or more conditions that can trigger a blind decoding limit adjustment at the UE, an indication of a UE type, or any combinations thereof.

Aspect 13: The method of any of aspects 1 through 12, wherein the receiving further comprises: receiving two or more trigger conditions that are associated with a corresponding two or more parameters associated with communications with the base station, and wherein the first blind decoding limit is maintained based at least in part on a first combination of the two or more trigger conditions and the second blind decoding limit is selected based at least in part on a second combination of the two or more trigger conditions.

Aspect 14: The method of any of aspects 1 through 13, wherein the trigger condition for adjustment of a first blind decoding limit is received jointly in a conditions configuration, in downlink control information, in a medium access control (MAC) control element, in radio resource control signaling, or any combinations thereof.

Aspect 15: A method for wireless communication at a base station, comprising: receiving, from a UE, an indication that blind decoding limit adjustments are supported at the UE; determining one or more trigger conditions for adjustment of at least a first blind decoding limit that indicates a number of blind decoding candidates that are to be monitored at the UE for a control channel communication from the base station; transmitting, to the UE, the one or more trigger conditions, including at least a first trigger condition for adjustment of the first blind decoding limit from a first number of blind decoding candidates to a second number of blind decoding candidates; and selecting a control channel resource for the control channel communication to the UE from the first number of blind decoding candidates or from the second number of blind decoding candidates based at least in part on whether the first trigger condition is satisfied.

Aspect 16: The method of aspect 15, wherein the first trigger condition is associated with a first bandwidth part (BWP), and wherein the first trigger condition is satisfied based at least in part on an indication that the UE is to use the first BWP for communications with the base station.

Aspect 17: The method of aspect 16, wherein the first trigger condition is indicated in a control channel information transmission associated a BWP switch to the first BWP, and wherein the first trigger condition is provided in a same control channel information transmission that indicates the BWP switch to the first BWP, in a different control channel information transmission, or any combinations thereof.

Aspect 18: The method of any of aspects 15 through 17, wherein the first trigger condition is associated with a first transmission configuration indicator (TCI) state, and wherein the first trigger condition is satisfied based at least in part on an indication that the UE is to use the first TCI state for communications with the base station.

Aspect 19: The method of aspect 18, wherein the first trigger condition is configured at the UE in RRC signaling, is indicated to the UE in a DCI transmission, or any combinations thereof.

Aspect 20: The method of any of aspects 15 through 19, wherein the first trigger condition is associated with a first portion of a periodic pattern and a second trigger condition is associated with a second portion of the periodic pattern, and wherein the first trigger condition or the second trigger condition is satisfied based at least in part on a location of a transmission slot within the periodic pattern.

Aspect 21: The method of any of aspects 15 through 20, wherein the first trigger condition is associated with a first type of control resource set (CORESET), wherein the first trigger condition is satisfied based at least in part on an indication that the UE is to monitor the first type of CORESET for control information from the base station, and wherein the first type of CORESET is a dynamic CORESET or a UE-requested CORESET.

Aspect 22: The method of any of aspects 15 through 21, wherein the first trigger condition is associated with a set of slots in which control information is configured to be provided in resources of a shared channel, and wherein the first trigger condition is satisfied based at least in part on whether a slot to be monitored is within the set of slots.

Aspect 23: The method of any of aspects 15 through 22, wherein the indication that blind decoding limit adjustments are supported at the UE is provided in a capability indication that is received from the UE, and wherein the capability indication includes one or more parameters that can trigger a blind decoding limit adjustment at the UE, an indication of a UE type, or any combinations thereof.

Aspect 24: The method of any of aspects 15 through 23, wherein two or more trigger conditions are associated with a corresponding two or more parameters associated with communications with the base station, and wherein the first blind decoding limit is maintained based at least in part on a first combination of the two or more trigger conditions and the second blind decoding limit is selected based at least in part on a second combination of the two or more trigger conditions.

Aspect 25: The method of any of aspects 15 through 24, wherein the trigger condition for adjustment of a first blind decoding limit is received jointly in a conditions configuration, in downlink control information, in a medium access control (MAC) control element, in radio resource control signaling, or any combinations thereof.

Aspect 26: An apparatus for wireless communication at a UE, comprising a processor; memory coupled with the processor; and instructions stored in the memory and executable by the processor to cause the apparatus to perform a method of any of aspects 1 through 14.

Aspect 27: An apparatus for wireless communication at a UE, comprising at least one means for performing a method of any of aspects 1 through 14.

Aspect 28: A non-transitory computer-readable medium storing code for wireless communication at a UE, the code comprising instructions executable by a processor to perform a method of any of aspects 1 through 14.

Aspect 29: An apparatus for wireless communication at a base station, comprising a processor; memory coupled with the processor; and instructions stored in the memory and executable by the processor to cause the apparatus to perform a method of any of aspects 15 through 25.

Aspect 30: An apparatus for wireless communication at a base station, comprising at least one means for performing a method of any of aspects 15 through 25.

Aspect 31: A non-transitory computer-readable medium storing code for wireless communication at a base station, the code comprising instructions executable by a processor to perform a method of any of aspects 15 through 25.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   transmitting, to a base station, an indication that blind decoding limit adjustments are supported at the UE;
   receiving, from the base station, a trigger condition for adjustment of a first blind decoding limit from a first number of blind decoding candidates that are to be monitored for a control channel communication from the base station to a second number of blind decoding candidates that are to be monitored from the control channel communication;
   detecting that the trigger condition is satisfied at the UE;
   adjusting, based at least in part on the detecting, a number of blind decoding candidates that are to be monitored for the control channel communication from the first number of blind decoding candidates to the second number of blind decoding candidates;
   wherein the indication that blind decoding limit adjustments are supported at the UE is provided in a capability indication that is transmitted to the base station, and wherein the capability indication includes one or more conditions that can trigger a blind decoding limit adjustment at the UE and an indication of a UE type, or any combinations thereof;
   wherein the receiving comprises:
   receiving a first trigger condition that is associated with a first bandwidth part (BWP), and wherein the first trigger condition is detected based at least in part on an indication that the UE is to use the first BWP for communications with the base station; and
   wherein the first trigger condition is configured at the UE in radio resource control (RRC) signaling that configures a plurality of different BWPs for communications between the UE and the base station.

2. The method of claim 1, wherein the first trigger condition is indicated in control channel information associated with a BWP switch to the first BWP, and wherein the first trigger condition is provided in a same control channel information transmission that indicates the BWP switch to the first BWP, in a different control channel information transmission, or any combinations thereof.

3. The method of claim 1, wherein the trigger condition for adjustment of the first blind decoding limit is received jointly in a conditions configuration, in downlink control information, in a medium access control (MAC) control element, in radio resource control signaling, or any combinations thereof.

4. A method for wireless communication at a base station, comprising:
   receiving, from a user equipment (UE), an indication that blind decoding limit adjustments are supported at the UE;
   determining one or more trigger conditions for adjustment of at least a first blind decoding limit that indicates a number of blind decoding candidates that are to be monitored at the UE for a control channel communication from the base station;
   transmitting, to the UE, the one or more trigger conditions, including at least a first trigger condition for adjustment of the first blind decoding limit from a first number of blind decoding candidates to a second number of blind decoding candidates;
   selecting a control channel resource for the control channel communication to the UE from the first number of blind decoding candidates or from the second number of blind decoding candidates based at least in part on whether the first trigger condition is satisfied;
   wherein the indication that blind decoding limit adjustments are supported at the UE is provided in a capability indication that is received from the UE, and wherein the capability indication includes one or more parameters that can trigger a blind decoding limit adjustment at the UE and an indication of a UE type, or any combinations thereof;
   wherein the first trigger condition is associated with a first transmission configuration indicator (TCI) state, and wherein the first trigger condition is satisfied based at least in part on an indication that the UE is to use the first TCI state for communications with the base station; and
   wherein the first trigger condition is configured at the UE in radio resource control (RRC) signaling, is indicated to the UE in a downlink control information (DCI) transmission, or any combinations thereof.

5. The method of claim 4, wherein:
   two or more trigger conditions are associated with a corresponding two or more parameters associated with communications with the base station, and
   wherein the first blind decoding limit is maintained based at least in part on a first combination of the two or more trigger conditions and a second blind decoding limit is selected based at least in part on a second combination of the two or more trigger conditions.

6. The method of claim 4, wherein the one or more trigger conditions for adjustment of the first blind decoding limit is received jointly in a conditions configuration, in downlink control information, in a medium access control (MAC) control element, in radio resource control signaling, or any combinations thereof.

7. An apparatus for wireless communication at a user equipment (UE), comprising:

means for transmitting, to a base station, an indication that blind decoding limit adjustments are supported at the UE;

means for receiving, from the base station, a trigger condition for adjustment of a first blind decoding limit from a first number of blind decoding candidates that are to be monitored for a control channel communication from the base station to a second number of blind decoding candidates that are to be monitored from the control channel communication;

means for detecting that the trigger condition is satisfied at the UE;

means for adjusting, based at least in part on the detecting, a number of blind decoding candidates that are to be monitored for the control channel communication from the first number of blind decoding candidates to the second number of blind decoding candidates;

wherein the indication that blind decoding limit adjustments are supported at the UE is provided in a capability indication that is transmitted to the base station, and wherein the capability indication includes one or more conditions that can trigger a blind decoding limit adjustment at the UE and an indication of a UE type, or any combinations thereof;

wherein the receiving comprises:

receiving a first trigger condition that is associated with a first bandwidth part (BWP), and wherein the first trigger condition is detected based at least in part on an indication that the UE is to use the first BWP for communications with the base station; and wherein the first trigger condition is configured at the UE in radio resource control (RRC) signaling that configures a plurality of different BWPs for communications between the UE and the base station.

8. The apparatus of claim 7, wherein the trigger condition for adjustment of the first blind decoding the first blind decoding limit is received jointly in a conditions configuration limit is received jointly in a conditions configuration, in downlink control information, in a medium access control (MAC) control element, in radio resource control signaling, or any combinations thereof.

9. An apparatus for wireless communication at a base station, comprising:

means for receiving, from a user equipment (UE), an indication that blind decoding limit adjustments are supported at the UE;

means for determining one or more trigger conditions for adjustment of at least a first blind decoding limit that indicates a number of blind decoding candidates that are to be monitored at the UE for a control channel communication from the base station;

means for transmitting, to the UE, the one or more trigger conditions, including at least a first trigger condition for adjustment of the first blind decoding limit from a first number of blind decoding candidates to a second number of blind decoding candidates;

means for selecting a control channel resource for the control channel communication to the UE from the first number of blind decoding candidates or from the second number of blind decoding candidates based at least in part on whether the first trigger condition is satisfied;

wherein the indication that blind decoding limit adjustments are supported at the UE is provided in a capability indication that is received from the UE, and wherein the capability indication includes one or more parameters that can trigger a blind decoding limit adjustment at the UE and an indication of a UE type, or any combinations thereof;

wherein the first trigger condition is associated with a first transmission configuration indicator (TCI) state, and wherein the first trigger condition is satisfied based at least in part on an indication that the UE is to use the first TCI state for communications with the base station; and wherein the first trigger condition is configured at the UE in radio resource control (RRC) signaling, is indicated to the UE in a downlink control information (DCI) transmission, or any combinations thereof.

10. The apparatus of claim 9, wherein the first trigger condition is associated with one or more of a first bandwidth part (BWP) of a plurality of BWPs, a first transmission configuration indicator (TCI) state of a plurality of TCI states, a first periodic pattern of a plurality of periodic patterns, a first type of control resource set (CORESET) of a plurality of CORESETs, a first slot of a plurality of slots, or any combinations thereof.

\* \* \* \* \*